(12) United States Patent
Guturi et al.

(10) Patent No.: US 10,656,876 B1
(45) Date of Patent: May 19, 2020

(54) CLOUD EDITION AND RETRIEVE

(71) Applicant: Cohesity, Inc., San Jose, CA (US)

(72) Inventors: Venkata Ranga Radhanikanth Guturi, San Jose, CA (US); Tushar Mahata, Cupertino, CA (US); Praveen Kumar Yarlagadda, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 16/186,934

(22) Filed: Nov. 12, 2018

(51) Int. Cl.
*G06F 3/06* (2006.01)
*H04L 29/08* (2006.01)
*H04L 29/06* (2006.01)

(52) U.S. Cl.
CPC ............ *G06F 3/0659* (2013.01); *G06F 3/065* (2013.01); *G06F 3/067* (2013.01); *G06F 3/0619* (2013.01); *G06F 3/0622* (2013.01); *G06F 3/0664* (2013.01); *H04L 67/1097* (2013.01); *H04L 63/08* (2013.01)

(58) Field of Classification Search
CPC ................. G06F 3/067; H04L 67/1097; H04L 29/08549
See application file for complete search history.

(56) References Cited

U.S. PATENT DOCUMENTS

| 2016/0004449 | A1* | 1/2016 | Lakshman | G06F 3/065 711/162 |
| 2018/0307736 | A1* | 10/2018 | Balakrishnan | G06F 16/2246 |

* cited by examiner

*Primary Examiner* — Edward J Dudek, Jr.
*Assistant Examiner* — Andrew Russell
(74) *Attorney, Agent, or Firm* — Van Pelt, Yi & James LLP

(57) ABSTRACT

A cloud instantiation of a secondary storage system is generated. An indication to virtually rebuild one or more secondary storage clusters based on a snapshot archive stored in cloud storage is received. The one or more secondary storage clusters are virtually rebuilt in the cloud instantiation of the secondary storage system, including by reconstituting a tree data structure based on the snapshot archive. A copy of at least a portion of data of the one or more rebuilt storage clusters in the cloud instantiation to restore at least the portion of data is provided to a user destination system.

20 Claims, 15 Drawing Sheets

US 10,656,876 B1

CLOUD EDITION AND RETRIEVE

BACKGROUND OF THE INVENTION

A primary system may be configured to perform a backup snapshot of its file system data to a secondary storage system. The secondary storage system may store the backup snapshot. The primary system may request to restore from the secondary storage system any of the file system data included in the backup snapshot. In some instances, the secondary storage system may go offline. As a result, the primary system is unable to restore from the secondary storage system any of the file system data included in the backup snapshot and must wait until the secondary storage comes back online.

BRIEF DESCRIPTION OF THE DRAWINGS

Various embodiments of the invention are disclosed in the following detailed description and the accompanying drawings.

DETAILED DESCRIPTION

Figure 1:
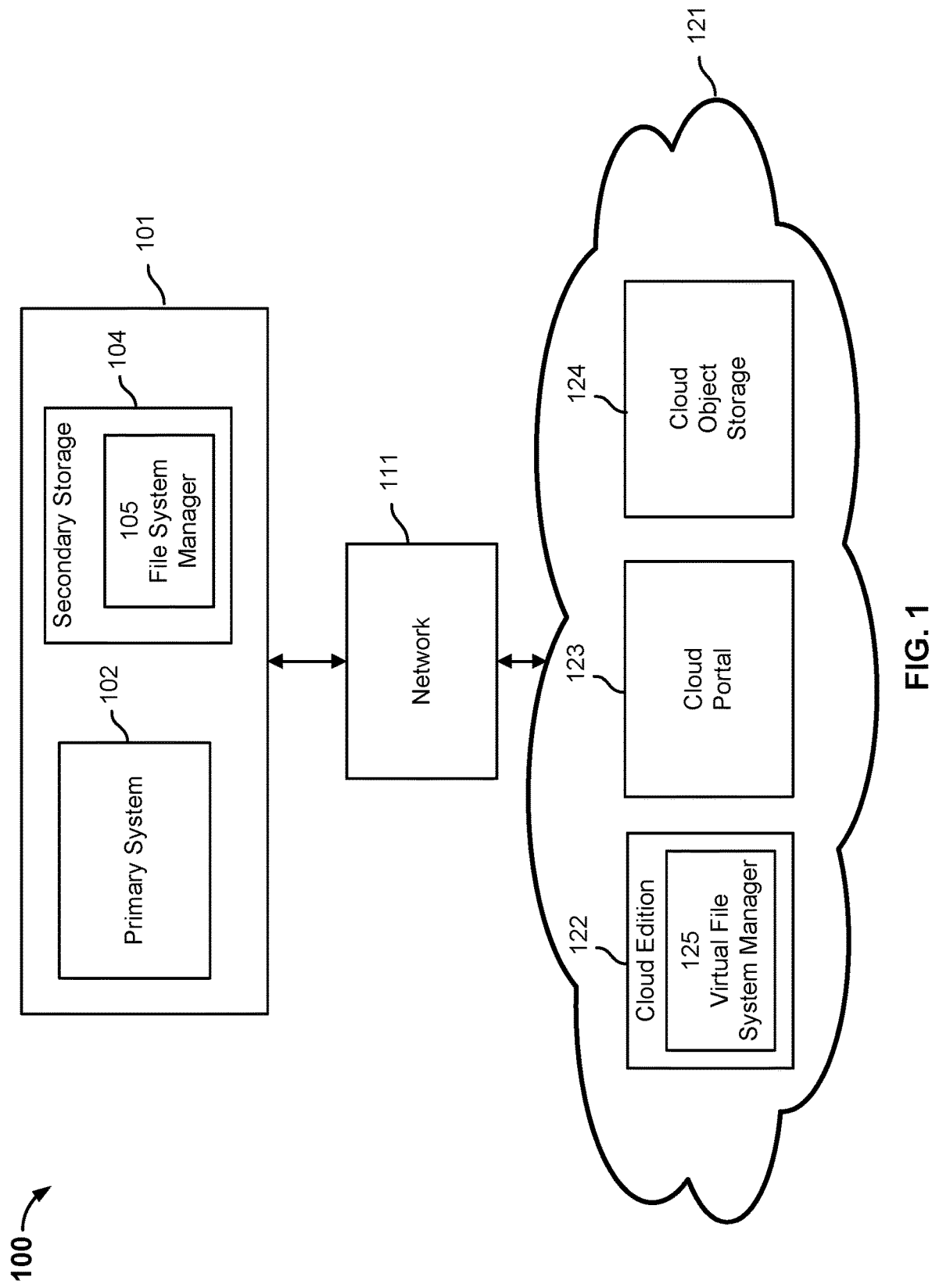
FIG. 1 is a block diagram illustrating an embodiment of a distributed storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A primary system comprises an object, virtual machine, physical entity, file system, array backup, and/or volume that stores file system data. The primary system may perform a backup snapshot according to a backup policy and store the backup snapshot to a secondary storage system. A backup snapshot represents the state of the primary system at a particular point in time (e.g., the state of the file system data). The backup policy may require a full backup snapshot and/or an incremental backup snapshot to be performed. A full backup snapshot stores the entire state of the primary system at a particular point in time. The file system data is comprised of a plurality of data blocks. The primary system may include a change block tracker that monitors and identifies one or more data blocks of the primary system that have changed (e.g., modified, deleted, added) since the last backup snapshot. An incremental backup snapshot includes the one or more data blocks that have changed since the last backup snapshot.

The one or more data blocks of a backup snapshot that are stored on a secondary storage system may be organized using a tree data structure. An example of the tree data structure is a snapshot tree (e.g., Cohesity Snaptree), which may be based on a B+ tree structure (or other type of tree structure in other embodiments). The snapshot tree enables a backup snapshot to be a fully hydrated backup snapshot, i.e., a backup snapshot that provides a complete view of the primary system at a moment in time corresponding to when the backup snapshot was performed. The snapshot tree may be used to capture different versions of file system data at different moments in time. For example, a first snapshot tree may correspond to a first backup snapshot and a second snapshot tree may correspond to a second backup snapshot. In some embodiments, the tree data structure allows a chain of snapshot trees (i.e., different snapshot tree versions) to be linked together by allowing a node of a later version of a snapshot tree to reference a node of a previous version of a snapshot tree (e.g., a "snapshot tree forest"). For example, a node of the second snapshot tree corresponding to the second backup snapshot may reference a node of the first snapshot tree corresponding to the first backup snapshot.

A snapshot tree includes a root node, one or more levels of one or more intermediate nodes associated with the root node, and one or more leaf nodes associated with an intermediate node of the lowest intermediate level. A root node or an intermediate node of a version of a snapshot tree may reference an intermediate node or a leaf node of a previous version of a snapshot tree. The root node of a snapshot tree includes one or more pointers to one or more intermediate nodes. Each intermediate node includes one or more pointers to other nodes (e.g., a lower intermediate node or a leaf node). Each time a backup snapshot is received by the secondary storage system, a corresponding snapshot tree is created. The corresponding snapshot tree is created by cloning the last snapshot tree. Cloning the last snapshot tree includes creating a new root node where the new root node includes the set of pointers included in the root node of the last snapshot tree, that is, the new root node includes one or more pointers to an intermediate node or leaf node associated with the last snapshot tree. The new root node also includes a view identifier (e.g., TreeID) that is different from the view identifier of the last root node. Each node of a snapshot tree has a corresponding view identifier. The view identifier associated with a node identifies a view with which the node is associated, e.g., the associated backup snapshot. A leaf node may store file system metadata, one or more data blocks, an identifier of one or more data blocks, a pointer to a file tree, or a pointer to a data block stored on the secondary storage system.

It is desirable to periodically archive the tree data structure to archive changes and provide fault tolerance. A backup snapshot may be archived from the secondary storage system to a cloud (e.g., Amazon Web Services, Microsoft Azure, Google Cloud, etc.). A backup snapshot may be archived to the cloud based on one or more archive policies. An archive policy may indicate that a backup snapshot is to be archived after being stored on the secondary storage system for a threshold duration (e.g., 30 days). The archive policy may indicate that a full snapshot archive of the file system data and/or an incremental snapshot archive of the file system data is to be performed. A full snapshot archive is an archive of a full backup snapshot. It includes all the nodes of a snapshot tree without referring back to the node of a previous snapshot tree. An incremental snapshot archive is an archive of an incremental backup snapshot. It includes the nodes that represent the difference between a backup snapshot and a previous backup snapshot and one or more references to one or more nodes associated with one or more previous snapshots.

If the storage where the tree data structure is to be archived natively understands and supports tree data structures, the backup snapshot can be directly copied to the archive storage in a native format. However, many storage solutions do not natively support tree data structures. The storage solutions that natively support tree data structures are often costly and inefficient for use as an archive.

It may be more efficient to archive data to a storage/ archive medium/system that is unable to natively support the tree data structure. For example, traditional third-party cloud solutions provide the ability to store computer files in a reliable manner but lack the ability to natively understand and support a tree data structure (e.g., do not natively provide the ability to perform tree data structure transactions). A snapshot archive may include file system data and serialized snapshot tree data. File system data includes one or more data chunks that make up data of a file system. In some embodiments, a version of file system data is comprised of one or more blocks that are segmented into one or more chunks of data, a chunk identifier is computed for each chunk of data, and the chunk identifiers are stored as file system metadata.

In addition to archiving the file system data, a corresponding serialized snapshot tree data is archived to the cloud. Serializing is a process by which a data file is generated to store data in a manner that mimics the structure of a tree data structure. The serialized data file may be encoded in a manner that allows the serialized data file to be utilized to reconstruct a desired portion of the tree data structure to obtain a data of interest from the serialized data file without the need to reconstruct the entire tree data structure. A serialized snapshot tree data stores the structure of the snapshot tree associated with the file system data as a flat set of data that is comprised of one or more blocks. Each block of the flat set of data corresponds to a node of the snapshot tree. The order of the data blocks of the serialized data file corresponds to an order of the tree data structure. A tree data structure may have a root node, a plurality of intermediate nodes, and a plurality of leaf nodes. The serialized data file first may include blocks corresponding to the root node, then the plurality of intermediate nodes, and then the plurality of leaf nodes. For example, a first data block of the serialized data file may correspond to a root node of the tree data structure, a second data block of the serialized data file may correspond to a first intermediate node of the tree data structure, a third data block of the serialized data file may correspond to a second intermediate node of the tree data structure, a fourth data block of the serialized data file may correspond to a first leaf node of the tree data structure, . . . and an nth data block of the serialized data file may correspond to the nth leaf node of the tree data structure. The blocks that correspond to an intermediate node or a root node may include a file offset to another block of the serialized snapshot tree data or a file offset to another block of a different serialized snapshot tree data. A block that corresponds to a leaf node may include a file offset to a portion of the archived file system data.

A user of the primary system may request to restore from cloud storage a snapshot archive corresponding to a particular state of the primary system. Normally, a secondary storage system may receive the snapshot archive from cloud storage and reconstitute a snapshot tree associated with the snapshot archive by deserializing the serialized data file. The user of the primary system may request file system data associated with the reconstituted snapshot tree. The reconstituted snapshot tree may be traversed and the requested file system data is provided to the primary system.

However, in some instances, the secondary storage system may be offline and the secondary storage system is unable to restore the snapshot archive from the cloud. For example, a physical component of the secondary storage system may have failed and needs to be replaced. It may take a particular period of time before the physical component is replaced (e.g., due to shipping time and/or repair time). The primary system may be unable to deserialize the snapshot archive from the cloud, that is, the snapshot archive is in a format that the primary system is unable to understand. As a result, a user of the primary system may have to wait for a period (e.g., days, weeks) before the secondary storage system comes back online. This causes the primary system to accrue undesirable downtime and may delay the primary system from performing one or more tasks associated with the file system data included in the snapshot archive.

A cloud edition, i.e., a cloud instantiation, of the secondary storage system may be generated. A configuration of cloud instantiation of the secondary storage system may be a replica of the secondary storage system. For example, an on-prem secondary storage system may be comprised of three nodes, each node with a storage capacity of 10 TB. A cloud instantiation of the secondary storage system may be comprised of three virtual nodes, each virtual node with a storage capacity of 10 TB. The user associated with the primary system may be authenticated. The user may be provided a list of one or more snapshot archives to which the user has access. A request to restore one or more snapshot archives may be received at a cloud portal associated with the secondary storage system from the user associated with a primary system. The request may be for a full snapshot archive or an incremental snapshot archive.

The one or more requested snapshot archives may be received at the cloud instantiation of the secondary storage system. The cloud instantiation of the secondary storage system may include a virtual file system manager that is configured to virtually rebuild the secondary storage system at least in part by reconstituting the requested snapshot archive. In some embodiments, a snapshot tree associated with the snapshot archive is reconstituted by deserializing the serialized snapshot tree data included in the received snapshot archive. For example, the received snapshot archive corresponds to a full snapshot archive. In other embodiments, a snapshot tree associated with the snapshot archive is reconstituted by deserializing serialized snapshot tree data included in the received snapshot archive and deserializing one or more other serialized snapshot tree data included in one or more other received snapshot archives. For example, the received snapshot archive corresponds to an incremental snapshot archive and the one or more other received snapshot archives may correspond to full or incremental snapshot archives to which the incremental snapshot archive refers.

Reconstituting the structure of a snapshot tree associated with the snapshot archive for the particular time includes reading the flat set of data associated with the serialized snapshot tree data included in the received snapshot archive. The flat set of data includes blocks of data that correspond to nodes of a snapshot tree and associated file offsets that correspond to pointers of the snapshot tree. The reproduced tree data structure is traversed. The file system data associated with the requested snapshot archive is provided to the primary system. In response to receiving the file system data, the primary system is able to restore itself back to a particular moment in time, i.e., a particular state.

The cloud instantiation of the secondary storage system reduces the amount of downtime of the primary system when the secondary storage system is offline because the primary system does not have to wait for the secondary storage system to come back online. It may take days, even weeks, before the secondary storage system is back online. The cloud instantiation of the secondary storage system may be generated within minutes and may enable the primary system to be restored to a particular state within minutes and/or hours.

FIG. 1 is a block diagram illustrating an embodiment of a distributed storage system. In the example shown, system 100 includes data center 101 coupled to cloud 121 via network 111.

Data center 101 is comprised of primary system 102 and a secondary storage system 104. Primary system 102 is a computing system that stores file system data. Primary system 102 may be comprised of one or more servers, one or more computing devices, one or more storage devices, and/or a combination thereof. Primary system 102 may be configured to send a backup snapshot of file system data to secondary storage system 104 according to one or more backup snapshot policies. In some embodiments, a backup snapshot policy indicates that file system data is to be backed up on a periodic basis (e.g., hourly, daily, weekly, monthly, etc.). In other embodiments, a backup snapshot policy indicates that file system data is to be backed up when a threshold size of data has changed. In other embodiments, a backup snapshot policy indicates that file system data is to be backed up upon a command from a user associated with primary system 102.

Secondary storage system 104 is a storage system configured to store file system data included in a backup snapshot received from primary system 102. Secondary storage system 104 may also be referred to as a secondary storage cluster. Secondary storage system 104 may be configured to implement policy-based archival of older backup snapshots from on-prem to cloud 121 for long-term retention. The cloud archive allows data to be indexed for fast search and retrieval back to on-prem from the cloud. The cloud archive allows recovery of data to a different site (e.g., another computing system) in the event primary system 102 and/or secondary storage system 104 fails. The cloud archive may allow data encryption in-flight and at-rest in the cloud. Secondary storage system 104 may be configured to archive a copy of a backup snapshot to cloud 121 for disaster recovery. Secondary storage system 104 may be configured to move certain file system data to cloud 121 to handle spikes in storage demand. Secondary storage system 104 may be configured to implement a policy-based waterfall model that moves cold data to cloud 121. Upon receiving a read for data that is stored at cloud 121, secondary storage system 104 is configured to retrieve the data and store the data at the secondary storage system 104.

Secondary storage system 104 is configured to organize the file system data in a tree data structure and to create a snapshot tree based on the file system data. The snapshot tree may provide a view of primary system 102 at a particular moment in time. A view depicts the connections between nodes and the data stored in one or more leaf nodes at the particular moment in time. The tree data structure allows a chain of snapshot trees to be linked together. Each time a backup snapshot is performed, a root node of the snapshot tree may be linked to one or more intermediate nodes associated with a previous snapshot tree. Secondary storage system 104 may archive the file system data to cloud 121. The archive may include the file system data and a serialized snapshot tree data that is a serialized version of the tree data structure. In some embodiments, the archive includes a full snapshot archive of the file system data. In other embodiments, the archive includes an incremental snapshot archive of the file system data.

Secondary storage system 104 may be configured to archive any of the data stored on secondary storage system 104 (e.g., tree data, other non-tree data) according to one or more archive policies. In some embodiments, an archive policy indicates that the data is to be archived to cloud 121 on a periodic basis (e.g., hourly, daily, weekly, monthly, etc.). In other embodiments, an archive policy indicates that data is to be archived to cloud 121 when a threshold size of data has changed. In other embodiments, an archive policy indicates that data is to be archived to cloud 121 upon a command from a user associated with secondary storage system 104.

Secondary storage system 104 may be comprised of a plurality of storage nodes. The plurality of storage nodes may comprise one or more solid state drives, one or more hard disk drives, or a combination thereof. Secondary storage system 104 may include one or more processors coupled to the storage drives and configured to archive data stored in the storage drives to cloud 121.

Secondary storage system 104 may include file system manager 105. File system manager 105 is configured to maintain file system data in the form of nodes arranged in a tree data structure. In some embodiments, leaf nodes in the snapshot tree include key-value pairs that associate data keys with values in the form of particular items of file system data. In other embodiments leaf nodes in the snapshot tree include a reference to a file tree that stores the metadata associated with a file. A user may request a particular item of data by providing a data key to file system manager 105, which traverses a snapshot tree to find the item of data associated with that data key. File system manager 105 may be configured to generate a snapshot archive of a snapshot tree. The snapshot archive includes a serialized version of the snapshot tree. File system manager 105 may be configured to perform one or more modifications, as disclosed herein, to a snapshot tree.

Data center 101 is coupled to cloud 121 via network 111. Network 111 may be one or more of the following: a local area network, a wide area network, a wired network, a wireless network, the Internet, an intranet, or any other appropriate communication network.

Cloud 121 may be a public cloud provider (e.g., Amazon Web Services, Microsoft Azure, Google Cloud). Cloud 121 is configured to receive a snapshot archive from secondary storage system 104 and store the snapshot archive in cloud object storage 124. Cloud object storage 124 may store a full snapshot of file system data and associated serialized snapshot tree data. Cloud object storage 124 may store an incremental snapshot of file system data and associated serialized snapshot tree data.

Cloud 121 may include cloud portal 123. Cloud portal 123 is associated with one or more secondary storage systems. Cloud portal 123 may provide a user associated with access to any snapshot archive to which the user is permitted.

An enterprise may be associated with one or more data centers. Each data center may have a corresponding secondary storage system. The corresponding secondary storage systems may be configured to archive corresponding backup snapshots to cloud 121 based on one or more archive policies. A user associated with the enterprise may be permitted to access a snapshot archive and request a snapshot archive to be restored to one of the one or more data centers associated with the enterprise. In other embodiments, the user is associated with one of the enterprise's data centers. The user may be permitted to access snapshot archives specific to that particular data center and restore to a primary system of the particular data center or the secondary storage system of the particular data center, the snapshot archives specific to that particular data center.

Cloud portal 123 is configured to authenticate a user associated with an enterprise. Cloud portal 123 may request the user associated with the enterprise to provide a credential that indicates the user is permitted to access the one or more snapshot archives associated with the enterprise.

Cloud portal 123 may cause a cloud instantiation 122 of secondary storage system 104 to be generated in response to a user request. Secondary storage system 104 is comprised of a plurality of storage nodes. Each storage node has a particular storage capacity. Cloud portal 123 may be configured to cause cloud instantiation 122 of secondary storage system 104 to have the same storage capacity as secondary storage system 104. For example, secondary storage system 104 may be comprised of three physical storage nodes, each physical storage having a storage capacity of 10 TB. Cloud portal 123 may be configured to generate cloud instantiation 122 to include three virtual cloud instances, each virtual cloud instance (e.g., a virtual machine) having a storage capacity of 10 TB. Cloud instantiation 122 may be configured for the public cloud (e.g., Amazon Web Services, Microsoft Azure, Google Cloud) in which cloud instantiation 122 will reside. In other embodiments, cloud instantiation 122 of secondary storage system 104 may have more storage capacity than secondary storage system 104. In other embodiments, cloud instantiation 122 of secondary storage system 104 may have less storage capacity than secondary storage system 104.

In response to validating the user's credential, a cloud user interface may provide to the user a list of one or more snapshot archives associated with the enterprise. The cloud user interface may receive a selection of a snapshot archive and an associated destination for the file system data associated with the selected snapshot archive.

Cloud object storage 124 is configured to store a plurality of snapshot archives. A subset of the snapshot archives may be associated with the enterprise associated with data center 101. For example, cloud object storage 124 is configured to store snapshot archives associated with a plurality of enterprises. Cloud object storage 124 may receive a request for one of the stored snapshot archives. In response to the request, cloud object storage 124 is configured to provide the requested snapshot archive to the cloud instantiation associated with the request, for example, cloud instantiation 122. Cloud 121 may include a plurality of cloud instantiations of secondary storage systems. Each cloud instantiation may correspond to a particular data center. An enterprise may be associated with a plurality of cloud instantiations. A plurality of enterprises may be associated with corresponding cloud instantiations.

Cloud instantiation 122 may include virtual file system manager 125. Cloud instantiation 122 may receive a snapshot archive from cloud object storage 124. Virtual file system manager 125 is configured to deserialize the serialized snapshot tree data included in the snapshot archive and reconstitute a snapshot tree associated with the snapshot archive. In some embodiments, virtual file system manager 125 is configured to reconstitute an entire snapshot tree because the associated snapshot archive is a full snapshot archive. In other embodiments, virtual file system manager 125 is configured to reconstitute a partial snapshot tree because the associated snapshot archive is an incremental snapshot archive. In other embodiments, a plurality of snapshot archives are received (e.g., incremental snapshot archives, one full snapshot archive) and virtual file system manager 125 is configured to reconstitute the entire snapshot tree based on the plurality of snapshot archives. The deserialized snapshot tree data may be stored across the virtual cloud instances of cloud instantiation 122.

Cloud storage 122 is configured to provide the file system data associated with the deserialized snapshot tree data to a requested destination. In some embodiments, the deserialized snapshot tree data is provided to a primary system, such as primary system 102. In other embodiments, the deserialized snapshot tree data is provided to a secondary storage system (e.g., a new secondary storage system is brought online).

Figure 2A:
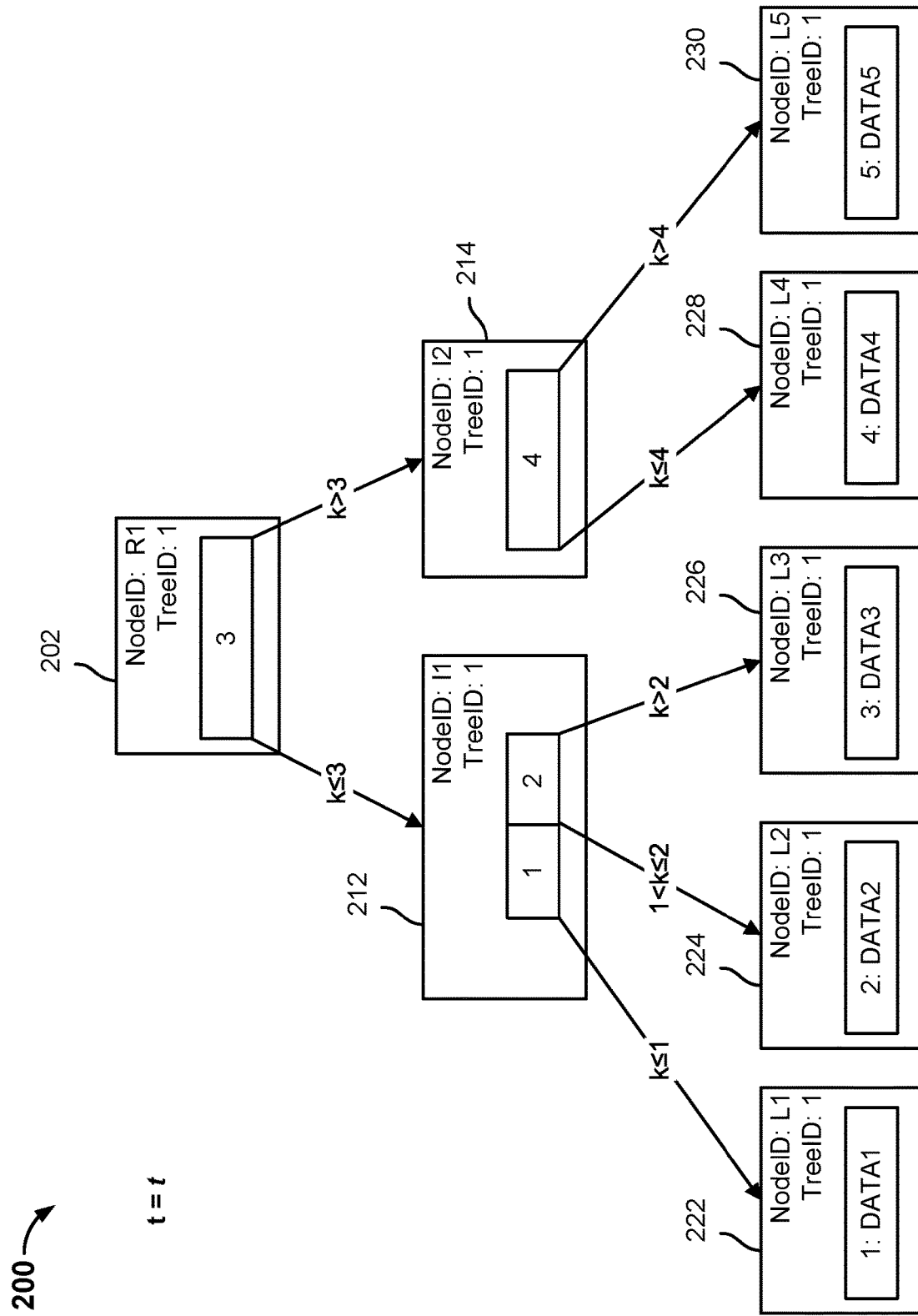
FIG. 2A is a block diagram illustrating an embodiment of a tree data structure storing file system data.

FIG. 2A is a block diagram illustrating an embodiment of a tree data structure storing file system data. In the example shown, tree data structure 200 may be created by a storage system, such as secondary storage system 104. The file system data of a primary system, such as primary system 102, may be backed up to a secondary storage system, such as secondary storage system 104. The primary system may perform a backup snapshot to back up the file system data. The backup snapshot may correspond to a full backup snapshot or an incremental backup snapshot. The manner in which the file system data is stored in a secondary storage system may be represented by a corresponding tree data structure, such as tree data structure 200.

In the example shown, tree data structure 200 is a snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, and 230, there could be any number of intermediate levels in a snapshot tree. Tree data structure 200 may be a snapshot tree of file system data at a particular point in time t and correspond to a version of a snapshot tree.

Root node 202 is associated with the backup snapshot of the file system data at the particular point in time t, i.e., a particular backup snapshot version. In some embodiments, the file system data is metadata for a distributed file system and may include information such as file size, directory structure, file permissions, physical storage locations of the files, etc.

A root node is the root of a snapshot tree and may include pointers to one or more other nodes. Each pointer includes a range of numerical and sorted data keys that can be found by following that particular pointer. An intermediate node is a node to which another node points (e.g., root node, other intermediate node) and includes one or more pointers to one or more other nodes. A leaf node is a node at the bottom of a snapshot tree. In some embodiments, a leaf node is a node to which another node points, but does not include a pointer to any other node. In other embodiments, a leaf node is a node to which another node points and includes a pointer to the root node of a file metadata tree (e.g., a snapshot tree for a particular file). A leaf node may store key-value pairs of file system data. A data key k is a lookup value by which a particular leaf node may be accessed. A file may be comprised of one or more data blocks. The file may be divided into a plurality of equal size blocks called bricks. The lookup value may correspond to a brick number. For example, "1" is a data key that may be used to lookup "DATA1" of leaf node 222. Examples of values stored by a leaf node include, but are not limited to, file size, directory structure, file permissions, physical storage locations of the files, etc. A leaf node may store a data key k and a pointer to a location that stores the value associated with the data key. The value may correspond to a data brick comprising one or more data blocks.

A root node or an intermediate node may include one or more node keys. The node key may be an integer value or a non-integer value. The node key may correspond to a brick number. Each node key indicates a division between the branches of the node and indicates how to traverse the tree data structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "3." To find a leaf node storing a value associated with a data key of "4" or "5," the second branch of root node 202 would be traversed to intermediate node 214 because data keys "4" and "5" are greater than the node key of "3."

In some embodiments, a hash function may determine which branch of a node with which the non-numerical data key is associated. For example, a hash function may determine that a first bucket is associated with a first branch of a node and a second bucket is associated with a second branch of the node.

A data key k of a key-value pair is not limited to a numerical value. In some embodiments, non-numerical data keys may be used for a data key-value pair (e.g., "name," "age," etc.) and a numerical number may be associated with the non-numerical data key. For example, a data key of "name" may correspond to a numerical key of "4." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the snapshot/view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than or equal to the node key (e.g., "1," "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 214 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "4." The pointer to leaf node 230 indicates that traversing tree data structure 200 from intermediate node 214 to leaf node 230 will lead to the node with a data key of "5."

A file may be comprised of a plurality of data blocks. The file may be divided into a plurality of fixed size data blocks called bricks. Information associated with a brick for a file may be kept in the tree data structure. For example, a leaf node may correspond to a brick and include a pointer to a location of the corresponding one or more data blocks stored in the brick. Given an offset in a file, the brick number may be determined by dividing the file offset by a brick size. The brick number may correspond to a data key k for a leaf node.

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222.

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224.

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226.

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228.

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230.

Figure 2B:
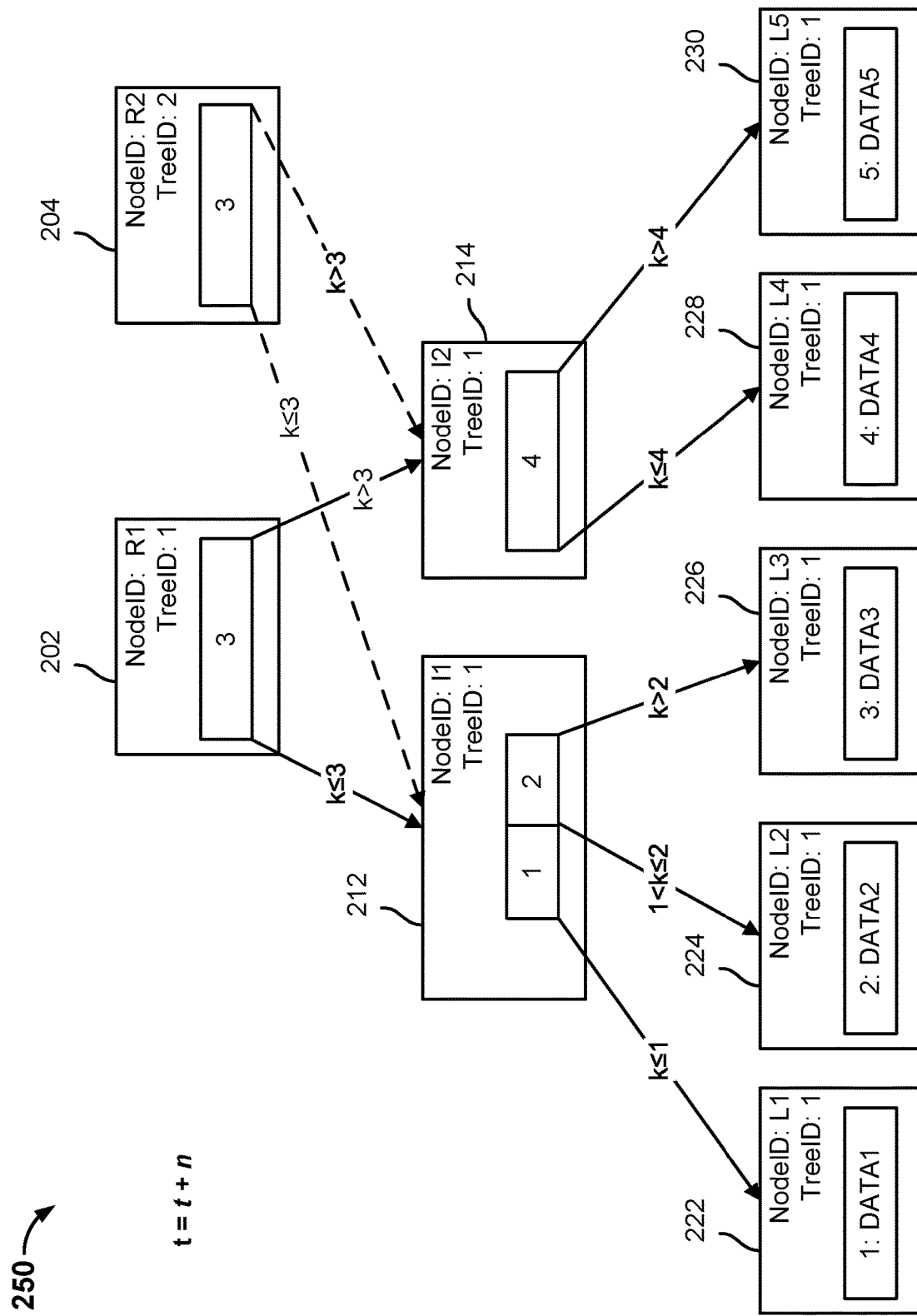
FIG. 2B is a block diagram illustrating an embodiment of cloning a snapshot tree of a tree data structure.

FIG. 2B is a block diagram illustrating an embodiment of cloning a snapshot tree of a tree data structure. In some embodiments, tree data structure 250 may be created by a file system manager, such as file system manager 105 of secondary storage system 104. The file system data of a primary system, such as primary system 102, may be backed up to a secondary storage system, such as secondary storage system 104. A subsequent backup snapshot may correspond to a full backup snapshot or an incremental backup snapshot. The manner in which the file system data corresponding to the subsequent backup snapshot is stored in secondary storage system 104 may be represented by a tree data structure. The tree data structure corresponding to the subsequent backup snapshot is created by cloning a snapshot tree associated with a last backup.

In the example shown, tree data structure 250 includes a snapshot tree that is comprised of root node 204, intermediate nodes 212, 214, and leaf nodes 222, 224, 226, 228, and 230. Tree data structure 250 may be a backup snapshot of file system data at a particular point in time t+n. The tree data structure allows a chain of snapshot trees to be linked together. Each time a backup snapshot is performed, a root node of the snapshot tree may be linked to one or more intermediate nodes associated with a previous snapshot tree. In the example shown, the snapshot tree at time t+n is linked to the snapshot tree at time t. To create a snapshot tree of the file system data at time t+n, a copy of the previous root node is created. The root node copy includes the same set of pointers as the original node. However, the root node copy may include a different NodeID and a different TreeID. The TreeID is the identifier associated with a view. Root node 204 is associated with the snapshot of the file system data at the particular point in time t+n. Root node 202 is associated with the snapshot of the file system data at the particular point in time t. The TreeID of a root node indicates a snapshot with which the root node is associated. For example, root node 202 with a TreeID of "1" is associated with a first backup snapshot and root node 204 with a TreeID of "2" is associated with a second backup snapshot.

In the example shown, root node 204 is a copy of root node 202. Similar to root node 202, root node 204 includes the same pointers as root node 202, except that root node 204 includes a different node identifier and a different view identifier. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "4" or "5." Root node 204 includes a NodeID of "R2" and a TreeID of "2." The NodeID identifies the name of the node. The TreeID identifies the snapshot with which the node is associated.

Figure 2C:
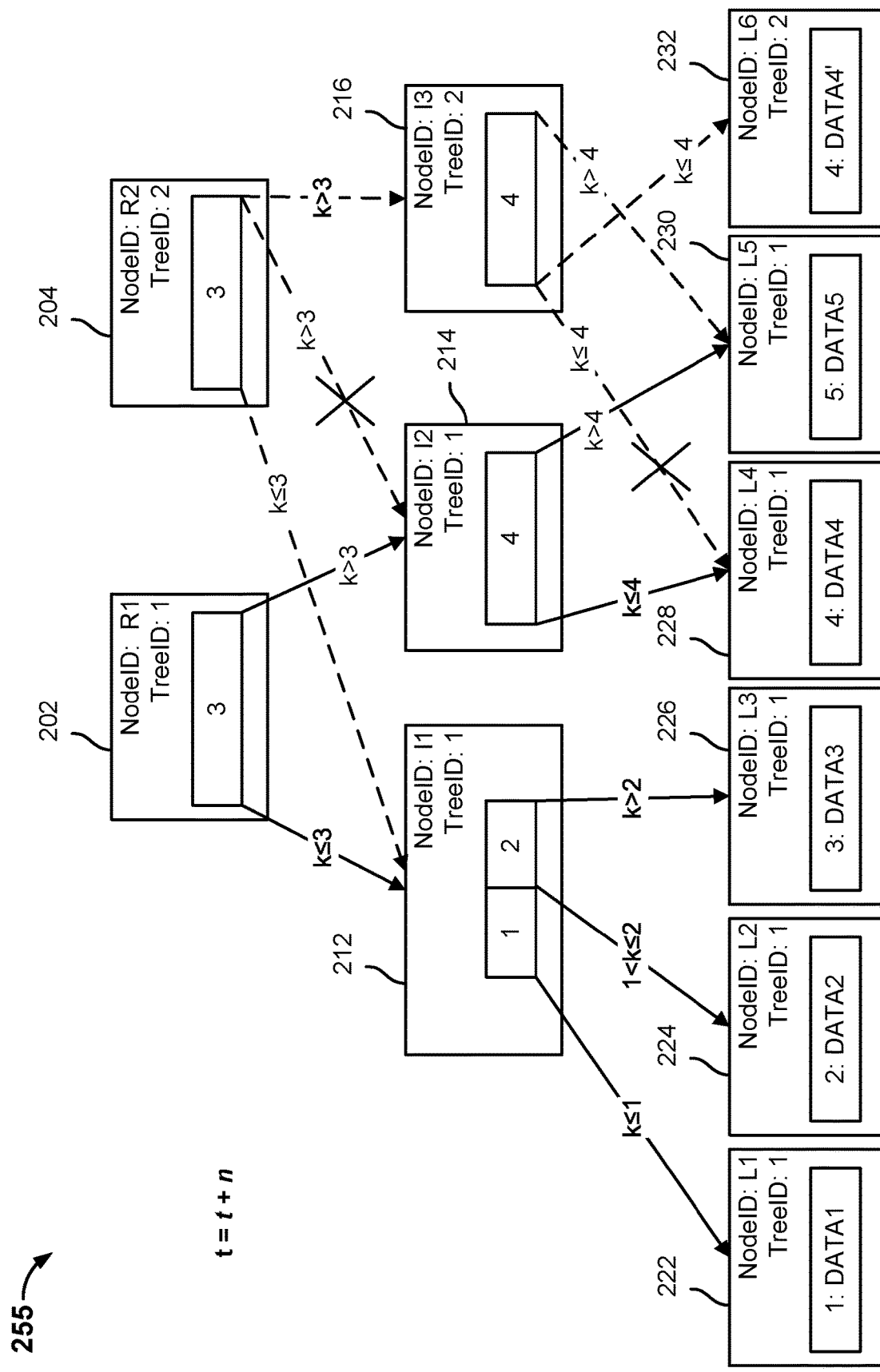
FIG. 2C is a block diagram illustrating an embodiment of modifying a snapshot tree.

FIG. 2C is a block diagram illustrating an embodiment of modifying a snapshot tree. In the example shown, tree data structure 255 may be modified by a file system manager, such as file system manager 105. Tree data structure 255 may be a current view of the file system data at time t+n. A current view may still accept one or more changes to the data. Because a snapshot represents a perspective of the file system metadata that is "frozen" in time, one or more copies of one or more nodes affected by a change to file system metadata are made. Tree data structure 255 may include a root node that corresponds to a version of a snapshot tree.

In the example shown, the value "DATA4" has been modified to be "DATA4'." At time t+n, the file system manager starts at root node 204 because that is the root node associated with snapshot tree at time t+n. The value "DATA4" is associated with the data key "4." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 204 and proceeds to intermediate node 214. The file system manager compares the TreeID of intermediate node 214 with the TreeID of root node 204 (the identifier associated with a snapshot at time t=t+n), determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a set of pointers of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

Figure 2D:
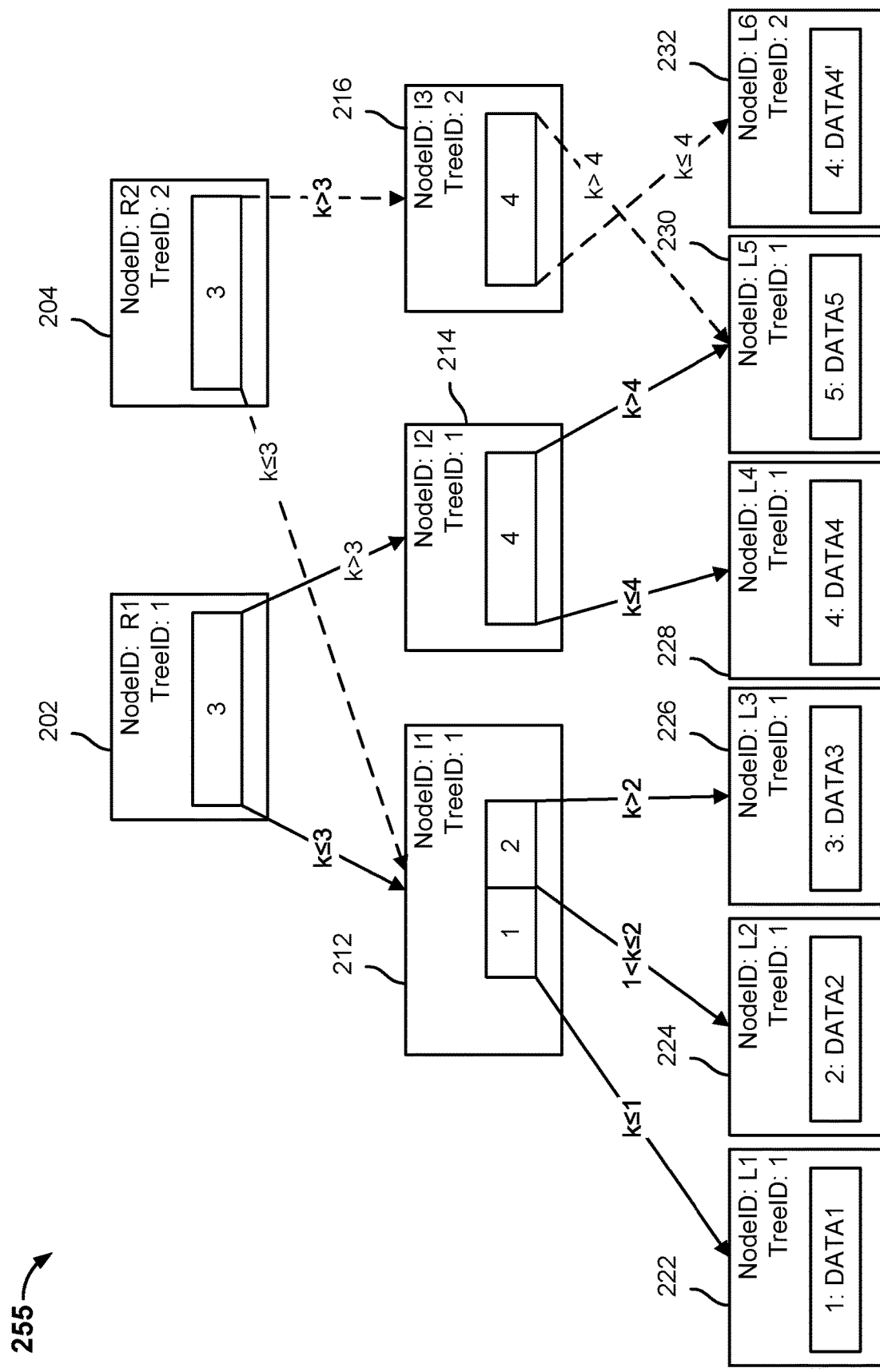
FIG. 2D is a block diagram illustrating an embodiment of a modified snapshot tree of a tree data structure.

FIG. 2D is a block diagram illustrating an embodiment of a modified snapshot tree of a tree data structure. The tree data structure 255 shown in FIG. 2D illustrates a result of the modifications made to tree data structure 255 as described with respect to FIG. 2C.

Figure 3A:
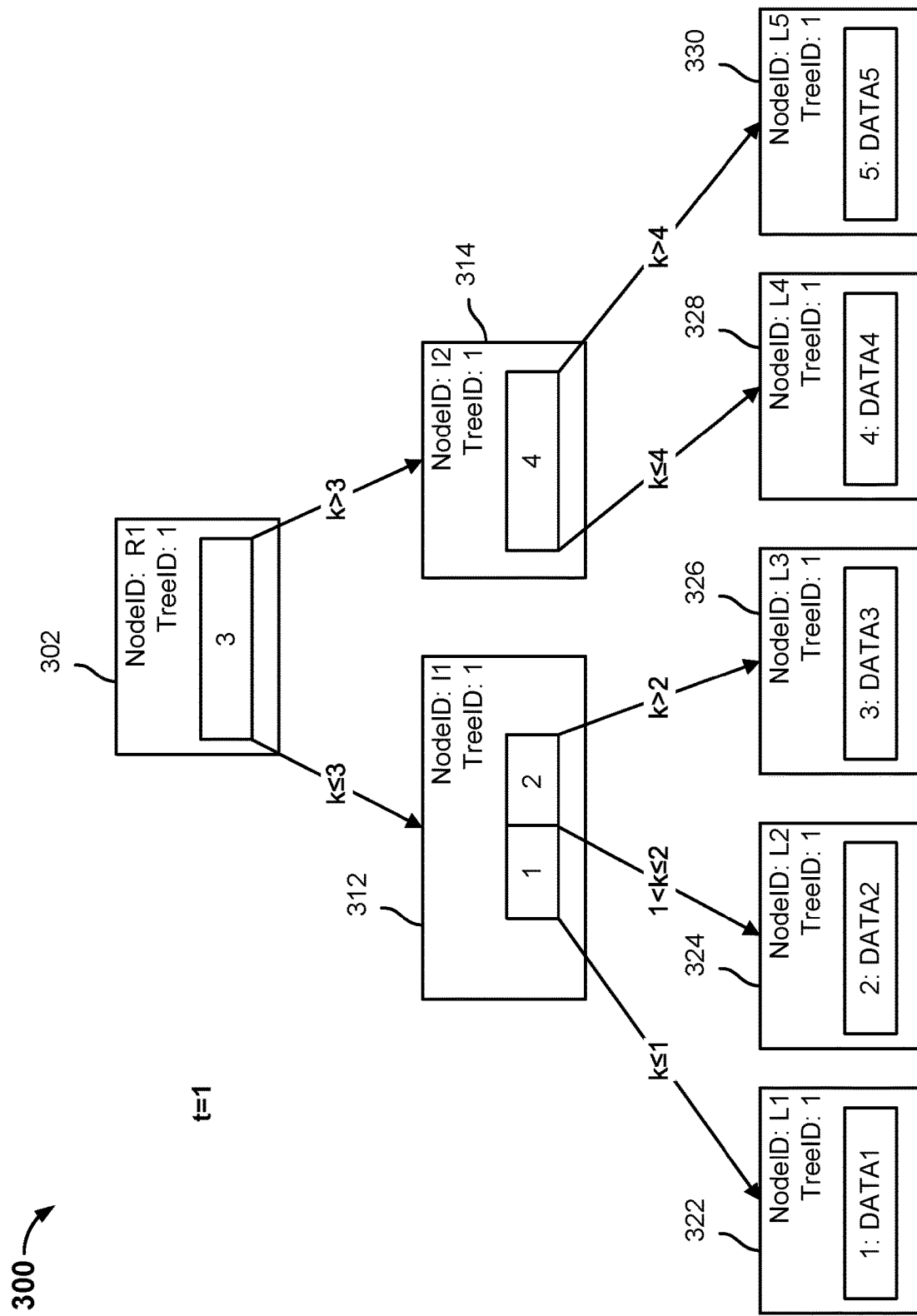
FIG. 3A is a block diagram illustrating an embodiment of a tree data structure at a particular moment in time.

FIG. 3A is a block diagram illustrating an embodiment of a tree data structure at a particular moment in time. In the example shown, tree data structure 300 is a snapshot tree at time t=1. At t=1, tree data structure 300 includes a root node 302, intermediate nodes 312, 314, and leaf nodes 322, 324, 326, 328, 330. At t=1, tree data structure 300 is similar to the tree data structure 200 shown in FIG. 2A. Tree data structure 300 may correspond to a version of a snapshot tree.

A full backup snapshot or an incremental backup snapshot of the snapshot tree at time t=1 may be performed and stored on the storage system. The full backup snapshot may provide a complete view of the tree data structure at a particular point in time, that is, the full backup snapshot stores all of the nodes associated with a snapshot at the particular moment in time. For example, a full backup snapshot at time t=1 would include root node 302, intermediate nodes 312, 314, and leaf nodes 322, 324, 326, 328, and 330. An incremental backup snapshot may provide a partial view of the tree data structure at a particular time. However, in this instance, an incremental backup snapshot at time t=1 would also include root node 302, intermediate nodes 312, 314, and leaf nodes 322, 324, 326, 328, and 330 because those nodes have not been previously stored.

Figure 3B:
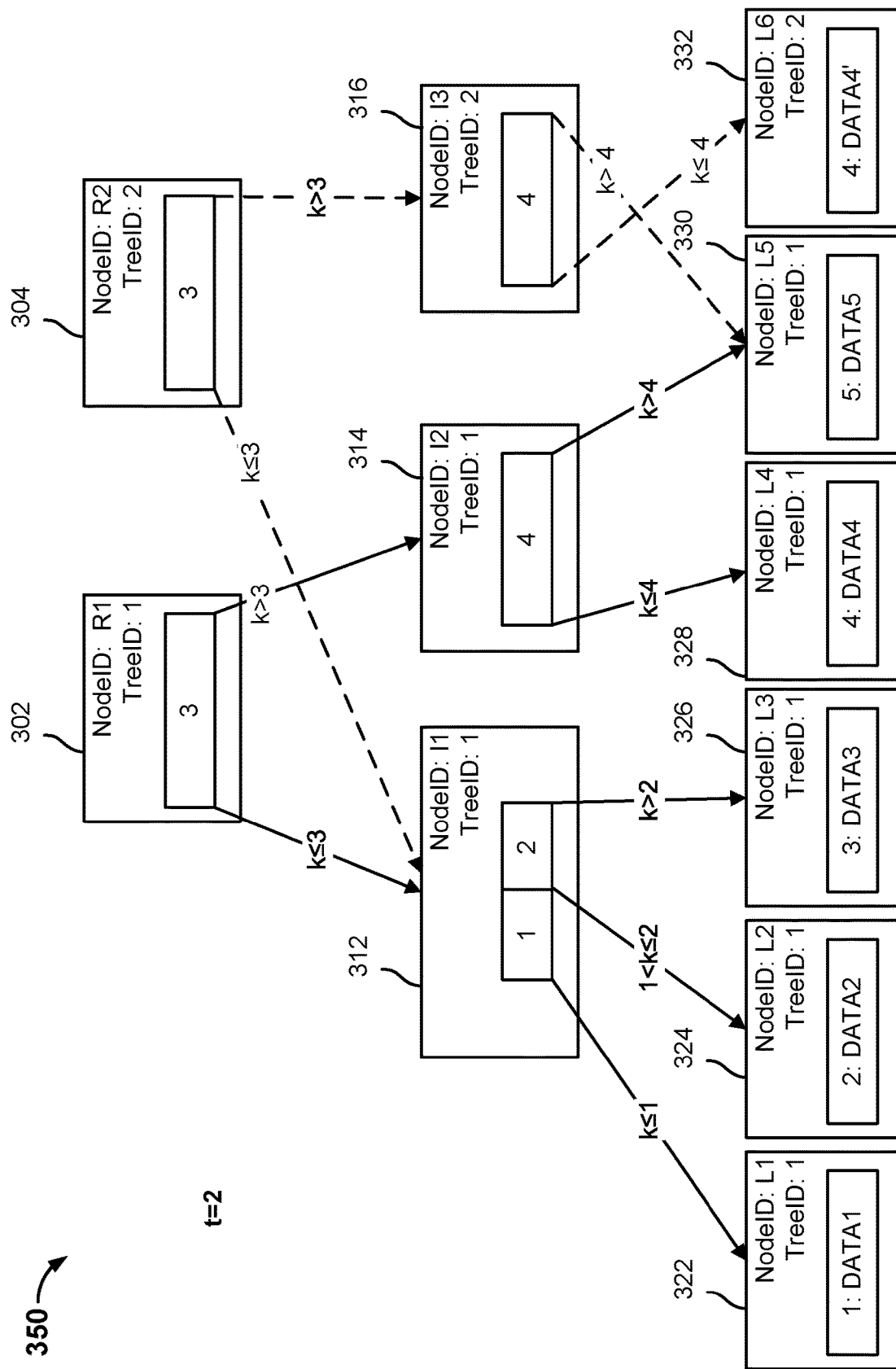
FIG. 3B is a block diagram illustrating an embodiment of a tree data structure at a particular moment in time.

FIG. 3B is a block diagram illustrating an embodiment of a tree data structure at a particular moment in time. The tree data structure allows a chain of snapshot trees to be linked together. Each time a backup snapshot is performed, a root node of the snapshot tree may be linked to one or more intermediate nodes associated with a previous snapshot tree. In the example shown, the snapshot tree at time t=2 is linked to the snapshot tree at time t=1. At t=2, the snapshot tree includes root node 304, intermediate nodes 312, 316, and leaf nodes 322, 324, 326, 330, 332. Root node 302 is associated with a snapshot at time t=1 and root node 304 is associated with a snapshot at time t=2. At t=2, the tree data structure 350 is similar to the tree data structure 255 shown in FIG. 2D. The snapshot tree at time t=2 is a modified version of the snapshot tree at time t=1 (i.e., the value of "DATA4" has been modified to be "DATA4'"). The snapshot at t=2 may correspond to a version of a snapshot tree.

A full backup snapshot or an incremental backup snapshot of the snapshot tree at t=2 may be performed and stored on the storage system. The snapshot trees corresponding to a full backup snapshot or incremental backup snapshot may provide a complete view of the file system data on the primary system at a particular point in time to which the snapshot tree is associated. For example, the snapshot tree at time t=2 would include root node 304, intermediate nodes 312, 316, and leaf nodes 322, 324, 326, 330, 332. This is a representation of the file system data of the primary system at t=2. The snapshot tree at time t 1 includes root node 302, intermediate nodes 312, 314, and leaf nodes 322, 324, 326, 328, 330. This is a representation of the file system data of the primary system at t=1. Each snapshot tree is a fully hydrated snapshot tree because each snapshot tree provides a complete view of the file system data at the time to which the snapshot tree corresponds.

Figure 3C:
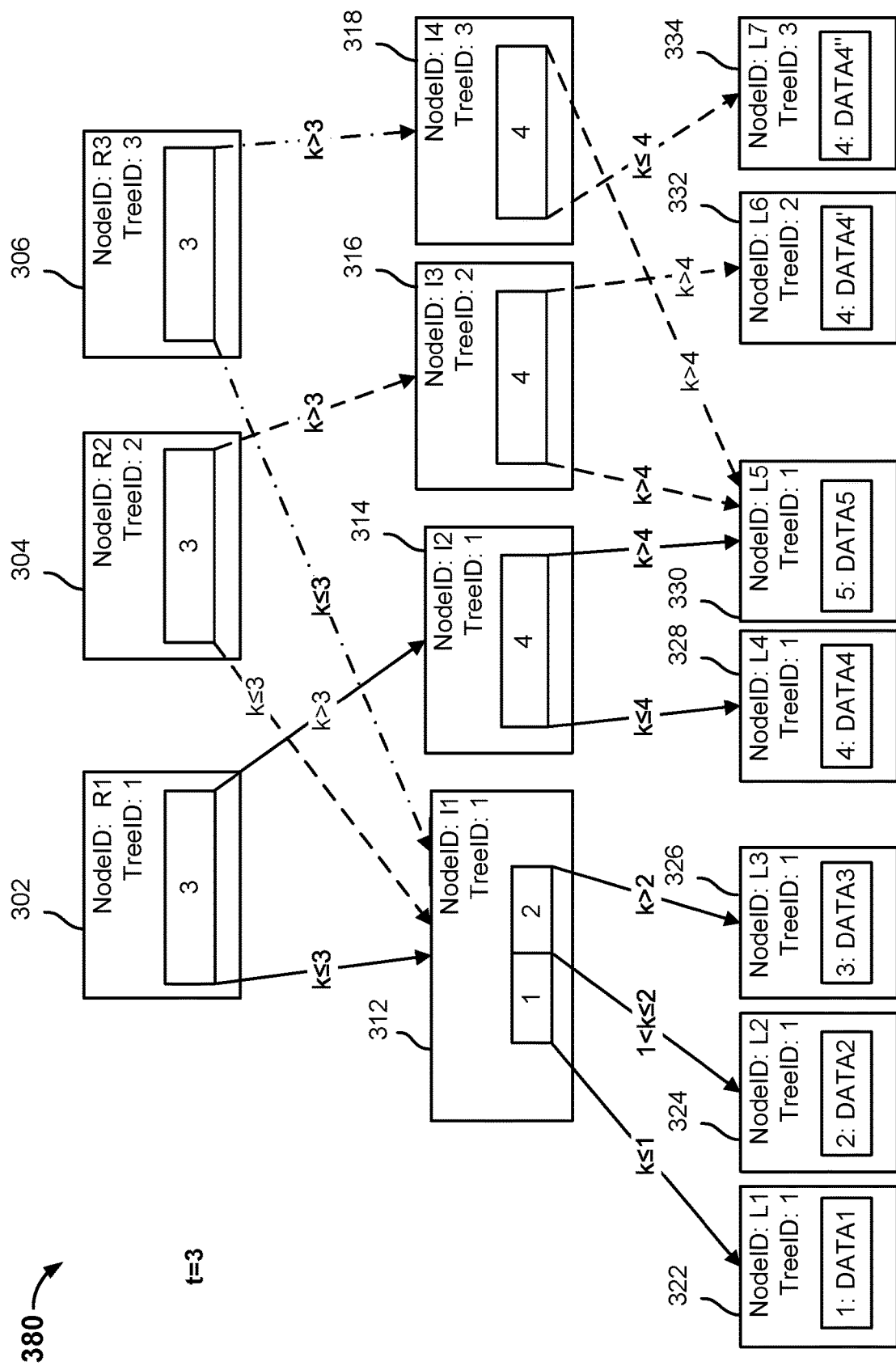
FIG. 3C is a block diagram illustrating an embodiment of a tree data structure at a particular moment in time.

FIG. 3C is a block diagram illustrating an embodiment of a tree data structure at a particular moment in time. In the example shown, tree data structure 380 includes a snapshot tree at time t=3. The tree data structure allows a chain of snapshot trees to be linked together. Each time a backup snapshot is performed, a root node of the snapshot tree may be linked to one or more intermediate nodes associated with a previous snapshot tree. In the example shown, the snapshot tree at t=3 is linked to the snapshot trees at t=1, 2. At t=3, the snapshot tree includes root node 306, intermediate nodes 312, 318, and leaf nodes 322, 324, 326, 330, 334. Root node 302 is associated with a backup snapshot at time t=1, root node 304 is associated with a backup snapshot at time t=2, and root node 306 is associated with a backup snapshot at time t=3. The snapshot tree at t 3 is a modified version of the backup snapshot at t=2 (i.e., the value of "DATA4'" has been modified to be "DATA4'''"). The snapshot tree at t=3 may correspond to a version of a snapshot tree.

Figure 3D:
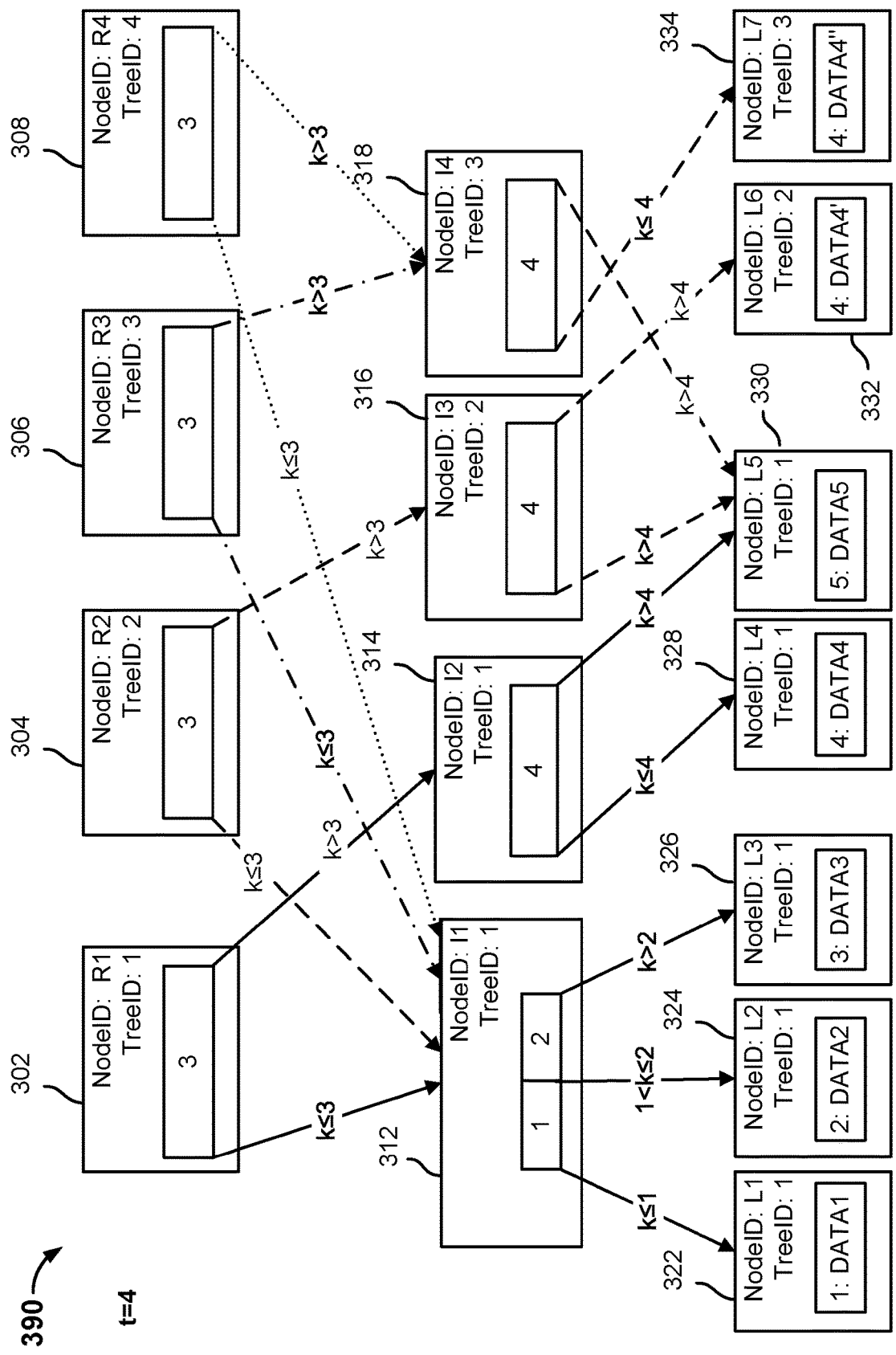
FIG. 3D is a block diagram illustrating an embodiment of a tree data structure at a particular moment in time.

FIG. 3D is a block diagram illustrating an embodiment of a tree data structure at a particular moment in time. In the example shown, tree data structure 390 includes a snapshot tree at time t=4. The tree data structure allows a chain of snapshot trees to be linked together. In the example shown, the snapshot tree at time t=4 is linked to the snapshot trees at times t=1, 2, 3. At t=4, the snapshot tree includes root node 308, intermediate nodes 312, 318, and leaf nodes 322, 324, 326, 330, 334. Root node 302 is associated with a snapshot at time t=1, root node 304 is associated with a snapshot at time t=2, root node 306 is associated with a snapshot at time t=3, and root node 308 is associated with a snapshot at time t=4. The snapshot tree at time t=4 may correspond to a version of a snapshot tree.

As seen in FIGS. 3B-3D, each snapshot tree builds off of a previous snapshot tree, that is, a chain of snapshot trees exists. Each snapshot tree is associated with a backup snapshot of the file system data. As more and more backup snapshots are created and linked, this may require a lot of storage to store the backup snapshots. To reduce the amount of storage needed to store the backup snapshots, a policy may indicate that after a full backup snapshot is performed at a particular point in time, one or more previous backup snapshots may be deleted from the storage system. In some embodiments, the one or more previous backup snapshots are deleted after a condition of a retention time policy has passed.

Figure 4A:
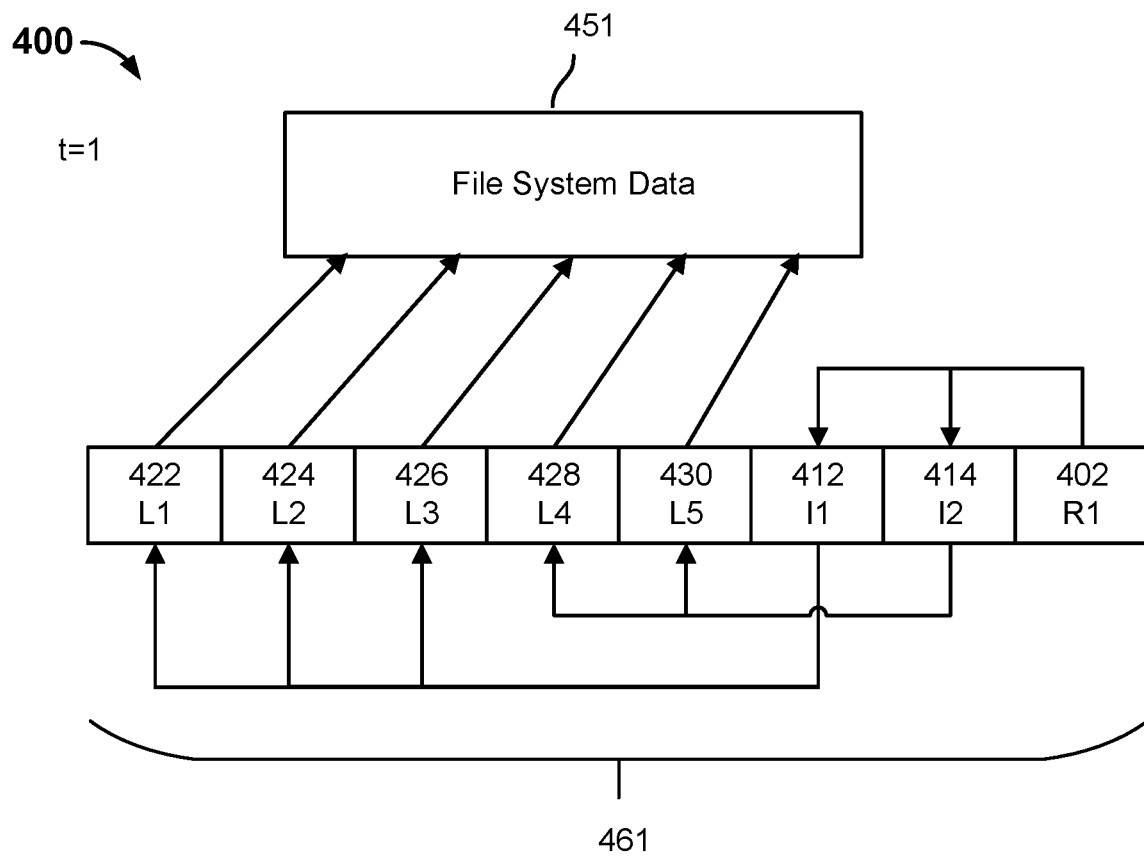
FIG. 4A is a block diagram illustrating an embodiment of archive data.

FIG. 4A is a block diagram illustrating an embodiment of archive data. A backup snapshot is the state of a system at a particular moment in time. A backup snapshot may be stored locally at a storage system, such as secondary storage system 104. A backup snapshot allows the state of a system to be rolled back to a moment in time for which a backup snapshot is stored. A system may store a large number of backup snapshots (e.g., thousands, millions). Each backup snapshot may require a significant amount of storage (e.g., GBs, TBs, PBs, etc.). In some instances, it may be desirable to archive a backup snapshot to a remote storage location, such as cloud 121. For example, one or more older backup snapshots may be archived to a remote storage location for long-term retention. One or more backup snapshots may be archived to a remote storage location for data recovery purposes (e.g., other storage systems may access the data associated with a backup snapshot in the event a storage location that locally stores the snapshot goes offline). One or more backup snapshots may be archived to a remote storage location to handle spikes in storage demand. One or more backup snapshots that include cold data (i.e., data that is not accessed frequently) may be archived to a remote storage location to free up local storage for one or more snapshots that include hot data (i.e., data that is accessed frequently).

The file system data associated with a backup snapshot may be archived to a remote storage location. An archive policy may indicate that a full snapshot archive of a backup snapshot or an incremental snapshot archive of the backup snapshot is to be performed and stored on a remote storage location. A full snapshot archive includes a complete view of a snapshot tree at a particular moment in time. A full snapshot archive includes a root node associated with the view at the particular moment in time and any intermediate nodes and/or leaf nodes associated with the root node. A full snapshot archive does not include a node of a previous version of the snapshot tree if the node is not pointed to by a node associated with the view at the particular moment in time. A full snapshot archive is similar to a full backup snapshot, except that the data associated with a full snapshot is stored at a remote location instead of on the storage system; that is the full snapshot archive includes the data stored in each of the nodes associated with the snapshot tree at the particular moment in time. For example, a full snapshot archive associated with a snapshot at t=3, as depicted in FIG. 3C, includes root node 306, intermediate nodes 312, 318, and leaf nodes 322, 324, 326, 330, and 334.

An incremental snapshot archive includes a partial view of one version of a snapshot tree at a particular moment in time. An incremental snapshot archive includes a representation of what was not previously archived. An incremental snapshot archive is similar to an incremental backup snapshot, except that the data associated with the incremental backup snapshot archive is stored at a remote location instead of on the storage system; that is, the incremental snapshot archive includes the data stored in the leaf nodes of the snapshot tree that has not been previously archived. For example, an incremental snapshot archive associated with a snapshot at t=3, as depicted in FIG. 3C, includes root node 306, intermediate node 318, and leaf node 334. The incremental snapshot archive at t=3 does not include root nodes 302, 304, intermediate nodes 312, 314, 316, or leaf nodes 322, 324, 326, 328, 330, 332 because those nodes were previously archived.

Figure 4B:
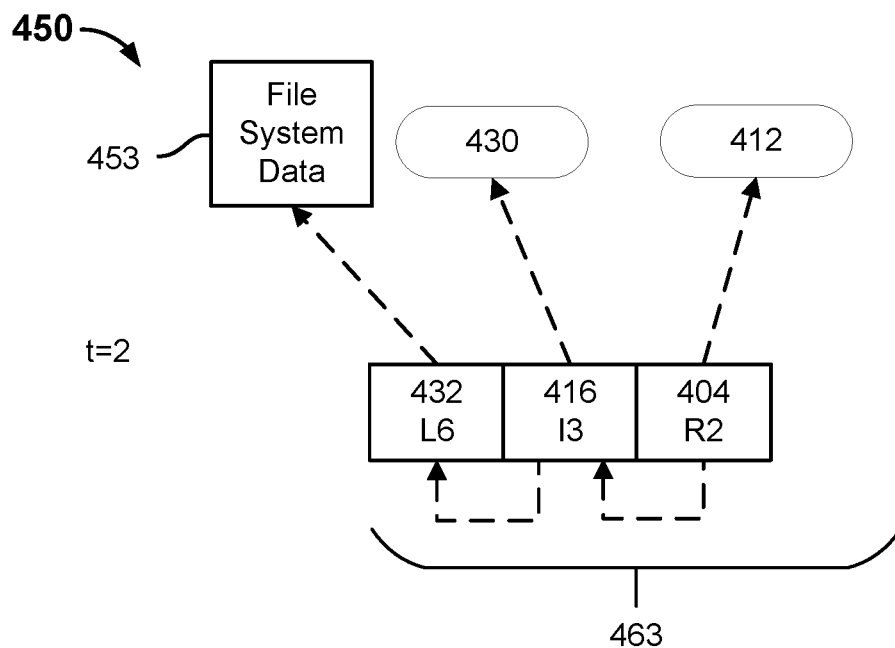
FIG. 4B is a block diagram illustrating an embodiment of archive data.
Figure 4C:
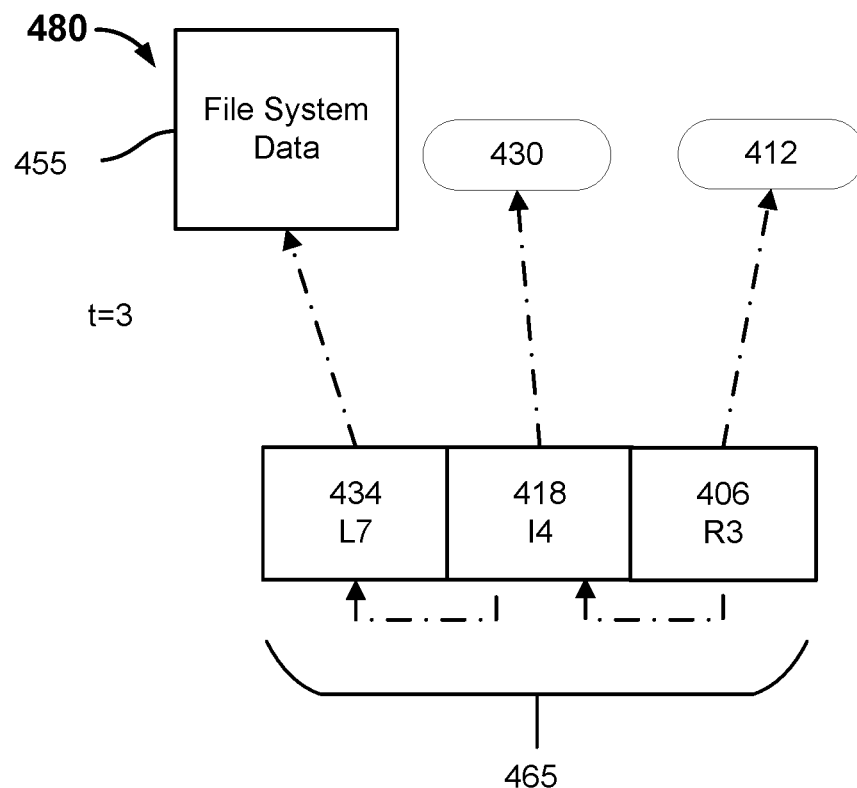
FIG. 4C is a block diagram illustrating an embodiment of archive data.
Figure 4D:
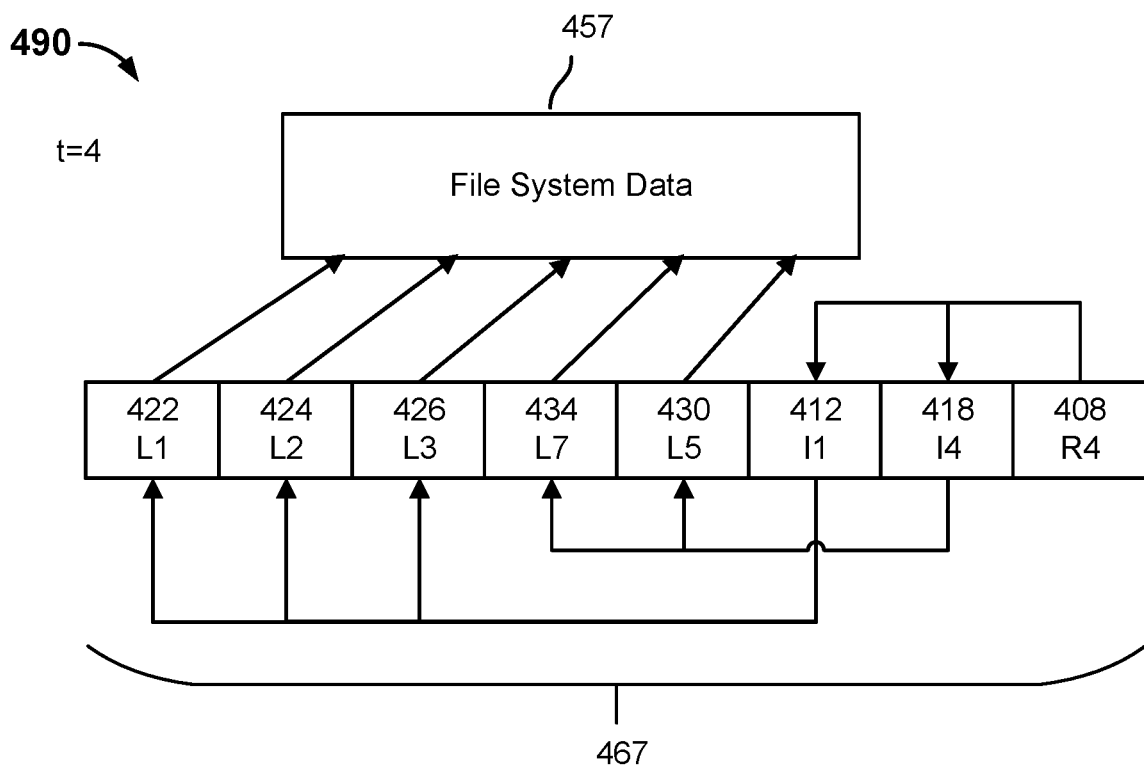
FIG. 4D is a block diagram illustrating an embodiment of archive data.

A full snapshot archive may be performed based on one or more policies associated with a backup storage system. For example, a full snapshot archive may be performed on a periodic basis (e.g., every X day(s), every Y week(s), every Z month(s), etc.), upon a threshold size of bytes changing from the previous full snapshot, after a threshold number of incremental snapshot archives have been performed, etc. A policy may indicate that an incremental snapshot archive is to be performed on a more frequent basis than a full snapshot archive. The full snapshot archive and incremental snapshot archives are associated with a backup snapshot corresponding to a state of file system data at a particular moment in time. For example, archive data 400 is associated with the snapshot tree at time t=1, archive data 450 is associated with the snapshot tree at time t=2, and archive data 480 is associated with the snapshot tree at time t=3. As seen in FIGS. 4A-4C, each snapshot archive builds off of a previous snapshot archive, that is, a block of serialized data includes a file offset to a block associated with previously serialized data. As more and more archives are created, this may require a lot of storage to store the archives. To reduce the amount of storage needed to store the archives, a policy may indicate that after a full snapshot archive, such as depicted in FIG. 4D, is performed at a particular point in time, one or more previous snapshot archives (i.e., archives 400, 450, 480) may be deleted from the remote storage location. In some embodiments, the one or more previous snapshot archives are deleted after a condition of retention time policy has passed.

In the example shown, archive data 400 can be archived by a storage system, such as secondary storage system 104, to a remote storage location, such as cloud 121. Archive data 400 may be stored in cloud object storage of cloud storage, such as cloud object storage 124 of cloud 121. In the example shown, archive data 400 includes file system data 451 and serialized snapshot tree data 461. In the example shown, archive data 400 is a file representation of a backup snapshot of the snapshot tree at a particular moment in time, t=1. Archive data 400 stores a full backup snapshot of the snapshot tree at time t=1. A full snapshot archive includes a complete view of the nodes of the snapshot tree at a particular moment in time (i.e., all nodes associated with a root node of the snapshot tree) and the data referenced or stored in each of the leaf nodes of the snapshot tree. For example, a leaf node may include a pointer to a storage location of a value. A full snapshot archive is independent on its own and does not refer back to one or more previous snapshot archives.

File system data of archive data that stores a full backup snapshot of a snapshot tree associated with a particular view includes all of the data stored in or referenced by the one or more leaf nodes of a backup snapshot, regardless of when a leaf node was created (i.e., the snapshot may include leaf nodes associated with previous snapshots). In the example shown, file system data 451 corresponds to data stored in the leaf nodes of the snapshot tree at time t=1. Since archive data 400 includes a full backup snapshot of the snapshot tree at t=1, file system data 451 includes the data stored in or referenced by leaf nodes 322, 324, 326, 328, and 330 in FIG. 3A, that is, file system data 451 includes "DATA1," "DATA2," "DATA3," "DATA4," and "DATA5." File system data 451 may be archived from a storage system, such as a secondary storage system 104, to a remote storage location, such as cloud 121. In some embodiments, the file system data is the data (e.g., data blocks of a file, data segments of a file) for a distributed file system. File system data may be stored as a flat set of data. In some embodiments, file system data 451 stores all the data blocks associated with leaf nodes of a snapshot tree. In other embodiments, file system data 451 stores all 1s and 0s of file data blocks associated with leaf nodes of a snapshot tree. In some embodiments, file system data 451 stores a plurality of file data blocks in a single block of file system data 451. In some embodiments, the file system data includes file system metadata, such as file size, directory structure, file permissions, physical storage locations of the files, etc.

A serialized snapshot tree data is configured to store the structure of the snapshot tree associated with the file system data as a flat set of data that is comprised of one or more blocks. Each block of the flat set of data corresponds to a node of the snapshot tree. A block may contain a file offset. A file offset represents a pointer of a snapshot tree. Because some archive systems cannot store pointers, a file offset is used in place of pointers. The file offset may be to another block of the serialized snapshot tree data. The file offset may be to another block of a different serialized snapshot tree data.

In the example shown, serialized snapshot tree data 461 corresponds to a snapshot tree at time t=1. Serialized snapshot tree data 461 is comprised of a plurality of blocks. Each block corresponds to one of the snapshot tree nodes. For example, blocks 422, 424, 426, 428, 430, 412, 414, and 402 correspond to nodes 322, 324, 326, 328, 330, 312, 314, and 302, respectively, of the snapshot tree at t=1 in FIG. 3A.

Block 402 corresponds to root node 302. Because root node 302 includes pointers to intermediate nodes 312 and 314, block 402 includes file offsets to blocks 412 and 414. Blocks 412 and 414 correspond to intermediate nodes 312 and 314, respectively. Because intermediate node 312 includes pointers to leaf nodes 322, 324, and 326, block 412 includes file offsets to blocks 422, 424, and 426. The file offsets correspond to the pointers of a snapshot tree. Similarly, block 414 includes file offsets to blocks 428, 430 because intermediate node 314 includes pointers to leaf nodes 328, 330.

Blocks 422, 424, 426, 428, and 430 correspond to the leaf nodes of snapshot tree 300 and each include a corresponding file offset to one or more blocks of the file system data stored in file system data 451. For example, block 422 includes an offset to one or more blocks in file system data 451 that store the value of L1. Similarly, blocks 424, 426, 428, 430 include corresponding offsets to one or more blocks in file system data 451 that store the value of L2, L3, L4, and L5, respectively.

FIG. 4B is a block diagram illustrating an embodiment of archive data. In the example shown, archive data 450 can be archived by a storage system, such as secondary storage system 104. In the example shown, archive data 450 includes file system data 453 and a serialized snapshot tree data 463.

File system data 453 is an incremental snapshot archive of the file system data stored in the one or more leaf nodes of a snapshot tree. An incremental snapshot archive may include changes to the data of a snapshot tree since a last snapshot archive (e.g., new data or modified data). For example, file system data 453 may include one or more values stored in or referenced by leaf nodes of the snapshot tree at time t=2 that were not previously archived. File system data 453 may be stored as a flat set of data. In some embodiments, file system data 453 stores all data blocks associated with leaf nodes of a snapshot tree that were not previously archived. In other embodiments, file system data 453 stores the corresponding 1s and 0s of file data blocks associated with leaf nodes of a snapshot tree that were not previously archived. In some embodiments, file system data 453 stores a plurality of file data blocks in a single block of file system data 453. In some embodiments, the file system data includes file system metadata, such as file size, directory structure, file permissions, physical storage locations of the files, etc.

Serialized snapshot tree data 463 is a serialized version of one or more nodes of the snapshot tree at time t=2 and is represented as a flat set of data that is comprised of one or more blocks. Each block of the flat set of data corresponds to a node of the snapshot tree. Serialized snapshot tree data 463 includes a serialized representation of one or more changes to a snapshot tree (e.g., new node, modified node, deleted node) since a previous snapshot. Serialized snapshot tree data may include a block for each root node of a snapshot tree.

To determine whether a node should be included in a serialized snapshot tree data, a file system manager starts at the root node associated with a snapshot view and traverses the snapshot tree. At each node of the snapshot tree, the file system manager determines whether that particular node existed and is the same as the one in the previous snapshot tree. In the event the node didn't exist in the previous snapshot tree or is different when compared to the corresponding node in the previous snapshot tree, a block corresponding to the node is included in serialized snapshot tree data. In the event the node is determined to have existed in the previous snapshot tree and is also the same as the corresponding node in the previous snapshot tree, a block corresponding to the node is not included in the serialized snapshot tree data because a previous serialized snapshot tree data already includes a block corresponding to the node. Instead, a file offset to the block of the previous serialized snapshot tree data may be included in one or more of the blocks in the serialized snapshot tree data.

For example, to create a snapshot at t=2, root node 304 was added. The snapshot tree at t=2 indicates that the value of "DATA4" has been modified to be "DATA4'." Intermediate node 316 and leaf node 332 were added to the snapshot tree to ensure that each node along this path has a TreeID of "2."

In the example shown, serialized snapshot tree data 463 corresponds to the root nodes of the snapshot tree at t=2 and the new nodes of snapshot tree at t=2. Serialized snapshot tree data 463 is comprised of a plurality of blocks. Each block corresponds to one of the nodes associated with the snapshot tree at t 2. For example, blocks 432, 416, 404 correspond to nodes 332, 316, 304, respectively. In other embodiments, serialized snapshot tree data corresponding to an incremental backup includes the root node associated with a snapshot view.

Block 404 corresponds to root node 304. Because root node 304 includes a pointer to intermediate node 312, block 404 includes a file offset to block 412 of serialized snapshot tree data 461. Previously stored serialized snapshot tree data 461 already includes block 412 that corresponds to intermediate node 312. A file offset to a previously stored serialized snapshot tree data is used to save memory and prevent storing duplicative data. Root node 304 also includes a pointer to intermediate node 316. Similarly, block 404 also includes a file offset to block 416, which corresponds to intermediate node 316.

Block 416 corresponds to intermediate node 316. Intermediate node 316 includes pointers to leaf nodes 330, 332. The value of leaf node 330 has not changed and was previously stored in file system metadata 451. To save memory and prevent storing duplicative data, block 416 includes a file offset to block 430 of serialized snapshot tree data 461. Block 416 also includes a file offset to block 432. Block 432 corresponds to leaf node 332. Intermediate node 316 is a new node because snapshot tree 300 did not include intermediate node 316. Thus, serialized snapshot tree data 463 includes a block that corresponds to intermediate node 316.

Block 432 corresponds to leaf node 332 of snapshot tree 350. Leaf node 332 is a new node because snapshot tree 300 did not include leaf node 332. Thus, serialized snapshot tree data 463 includes a block that corresponds to leaf node 332. Block 432 includes a file offset to one or more blocks in file system data 453 that store the value of leaf node 332.

FIG. 4C is a block diagram illustrating an embodiment of archive data. In the example shown, archive data 480 can be archived by a system, such as secondary storage system 104. In the example shown, archive data 480 includes file system data 455 and a serialized snapshot tree data 465.

File system data 455 is an incremental snapshot archive of the file system data stored in or referenced by the one or more leaf nodes of a snapshot tree. For example, file system data 455 may include one or more values of the snapshot tree at time t=3 that were not previously archived. File system data 455 may be stored as a flat set of data. In some embodiments, file system data 455 stores all data blocks associated with leaf nodes of a snapshot tree that were not previously archived. In other embodiments, file system data 455 stores the corresponding 1s and 0s of file data blocks associated with leaf nodes of a snapshot tree that were not previously archived. In some embodiments, file system data 455 stores a plurality of file data blocks in a single block of file system data 455. In some embodiments, the file system data includes file system metadata, such as file size, directory structure, file permissions, physical storage locations of the files, etc.

Serialized snapshot tree data 465 is a serialized version of one or more nodes of the snapshot tree at time t=3 and is represented as a flat set of data that is comprised of one or more blocks. Each block of the flat set of data corresponds to a node of the snapshot tree. To create a snapshot at t=3, root node 306 was added. The snapshot tree indicates that the value of "DATA4'" has been modified to be "DATA4"." Intermediate node 318 and leaf node 334 were added to the snapshot tree at t=3 to ensure that each node along this path has a TreeID of "3."

In the example shown, serialized snapshot tree data 465 corresponds to root nodes of the snapshot tree at time t=3 and the new nodes of the snapshot tree at time t=3. Serialized snapshot tree data 465 is comprised of a plurality of blocks. Each block corresponds to one of the nodes of the snapshot tree at time t=3. For example, blocks 434, 418, 406 correspond to nodes 334, 318, 306, respectively.

Block 406 corresponds to root node 306. Because root node 306 includes a pointer to intermediate node 312, block 406 includes a file offset to block 412 of serialized snapshot tree data 461. Root node 306 includes a pointer to intermediate node 318. Similarly, block 406 includes a file offset to block 418, which corresponds to intermediate node 318.

Block 418 corresponds to intermediate node 318. Intermediate node 318 includes a pointer to leaf nodes 330, 334. The value of leaf node 330 has not changed and was previously stored in file system metadata 451. To save memory and prevent storing duplicative data, block 418 includes a file offset to block 430 of serialized snapshot tree data 461. Block 418 also includes a file offset to block 434. Block 434 corresponds to leaf node 334. Intermediate node 318 is a new node because snapshot tree 350 did not include intermediate node 318. Thus, archive data 480 includes a block that corresponds to intermediate node 318.

Block 434 corresponds to leaf node 334 of snapshot tree 380. Leaf node 334 is a new node because snapshot tree 350 did not include leaf node 334 at t=2. Thus, archive data 480 includes a block that corresponds to leaf node 334. Block 434 includes a file offset to a block of file system metadata 455 that stores the value of leaf node 334.

FIG. 4D is a block diagram illustrating an embodiment of archive data. In the example shown, archive data 490 can be archived by a storage system, such as secondary storage system 104. In the example shown, archive data 490 includes file system data 457 and a serialized snapshot tree data 467. In the example shown, archive data 490 is a file representation of snapshot tree at time t=4. Archive data 490 stores a full snapshot of the snapshot tree at time t=4. A full snapshot archive includes a representation of all of the nodes of a snapshot of a snapshot tree at a particular moment in time (i.e., all nodes associated with a root node of the snapshot tree) and the data stored in each of the leaf nodes of the snapshot tree.

In the example shown, serialized snapshot tree data 467 corresponds to the snapshot tree at t=4. Serialized snapshot tree data 467 is comprised of a plurality of blocks. Each block corresponds to one of the snapshot tree nodes. For example, blocks 422, 424, 426, 434, 430, 412, 418, and 408 correspond to nodes 322, 324, 326, 334, 330, 312, 318, and 308, respectively, of the snapshot tree at time t=4.

Block 408 corresponds to root node 308. Because root node 308 includes pointers to intermediate nodes 312 and 318, block 408 includes file offsets to blocks 412 and 418. Blocks 412 and 418 correspond to intermediate nodes 312 and 318, respectively. Because intermediate node 312 includes pointers to leaf nodes 322, 324, and 326, block 412 includes file offsets to blocks 422, 424, and 426. The file offsets correspond to the pointers of a snapshot tree. Similarly, block 418 includes file offsets to blocks 434, 430 because intermediate node 318 includes pointers to leaf nodes 334, 330.

Blocks 422, 424, 426, 434, and 430 correspond to the leaf nodes of snapshot tree 390 and each include a corresponding file offset to one or more blocks of the file system data stored in file system data 457. For example, block 422 includes an offset to one or more blocks in file system data 457 that stores the value of L1. Similarly, blocks 424, 426, 434, 430 include corresponding offsets to one or more blocks in file system data 457 that store the value of L2, L3, L7, and L5, respectively.

As seen in FIGS. 4A-4C, a serialized snapshot tree data may be linked with a previous serialized snapshot tree data. As more and more backup snapshots are archived, this may require a lot of storage to archive the serialized snapshot tree data. To reduce the amount of storage needed to store the archives, a policy may indicate that after a full snapshot archive, such as archive 490, is performed at a particular point in time, one or more previous archives may be deleted from cloud storage, i.e., archive data 400, 450, 480. For example, archive data 400, 450, 480 may be deleted after archive data 490 is archived. In some embodiments, the one or more previous snapshot archives are deleted after a condition associated with a retention time policy has passed. For example, a policy may indicate that data is to be archived for a period of thirty days.

Figure 5:
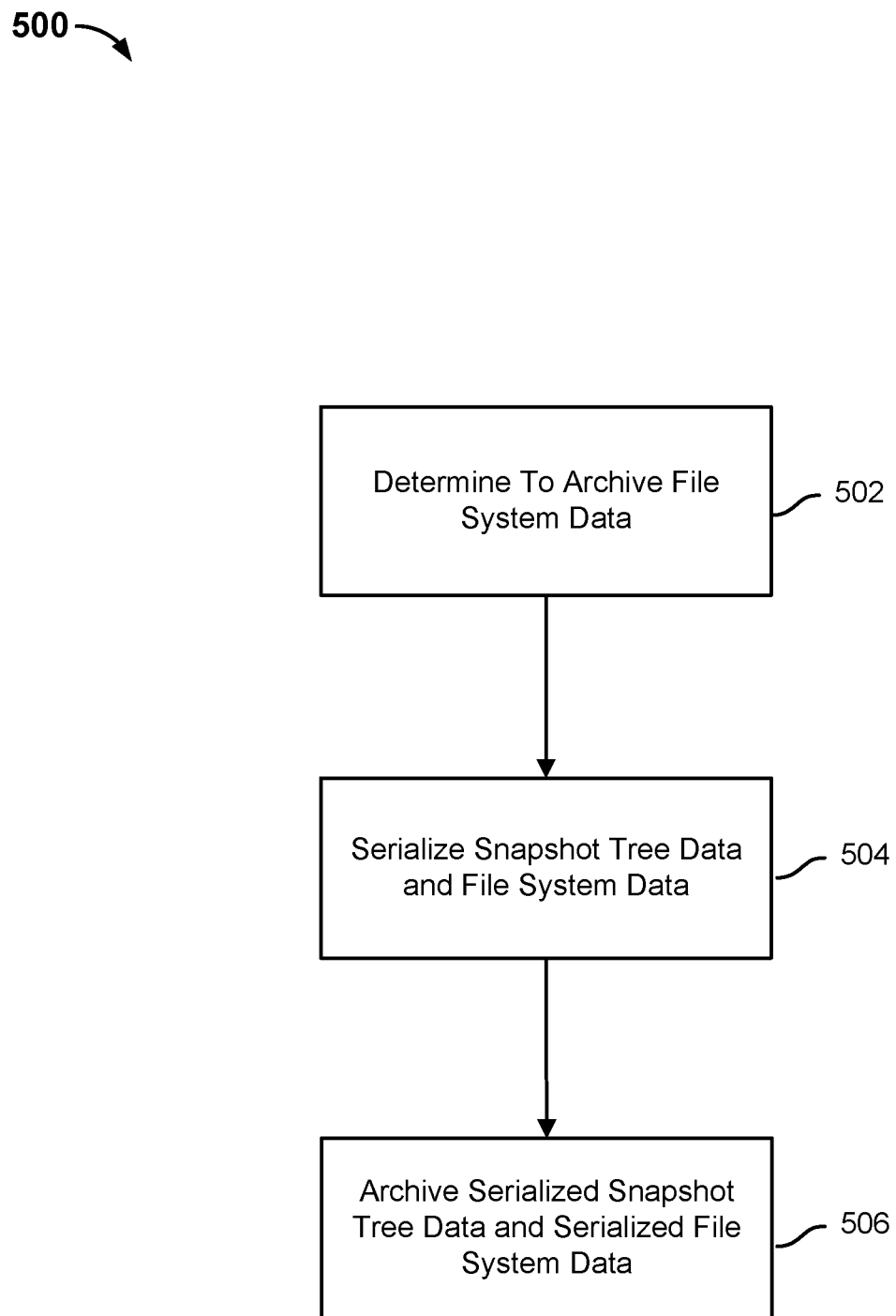
FIG. 5 is a flow chart illustrating an embodiment of archiving data.

FIG. 5 is a flow chart illustrating an embodiment of archiving data. In the example shown, process 500 may be implemented by a storage system, such as secondary storage system 104. In some embodiments, process 500 is a full snapshot archive. In other embodiments, process 500 is an incremental snapshot archive.

At 502, is it is determined that file system data is to be archived. A backup snapshot is the state of a system at a particular moment in time. A backup snapshot may be stored locally at a storage system, such as secondary storage system 104. A backup snapshot allows the state of a system to be rolled back to a moment in time for which a snapshot is stored. A system may store a large number of backup snapshots (e.g., thousands, millions). Each backup snapshot may require a significant amount of storage (e.g., GBs, TBs, PBs, etc.). In some instances, it may be desirable to archive a backup snapshot to a remote storage location, such as cloud 121. The file system data associated with a backup snapshot may be archived to a remote storage location. An archive policy may indicate that a full snapshot archive of a snapshot or an incremental snapshot archive of the backup snapshot is to be performed and stored on a remote storage location. A full snapshot archive includes a complete view of one version of a snapshot tree at a particular moment in time. A full snapshot archive includes a root node associated with the view at the particular moment in time and any intermediate nodes and/or leaf nodes associated with the root node. A full snapshot archive does not include a node of a previous version of the snapshot tree if the node is not pointed to by a node associated with the view at the particular moment in time. A full snapshot archive is similar to a full backup snapshot, except that the data associated with the full backup snapshot is stored at a remote location instead of on the storage system; that is, the full snapshot archive includes the data stored in each of the nodes associated with the snapshot tree at the particular moment in time. For example, a full snapshot archive associated with a snapshot at t=3, as depicted in FIG. 3C, includes root node 306, intermediate nodes 312, 318, and leaf nodes 322, 324, 326, 330, and 334.

An incremental snapshot archive includes a partial view of one version of a snapshot tree at a particular moment in time. An incremental snapshot archive includes a representation of what was not previously archived. An incremental snapshot archive is similar to an incremental snapshot, except that the data associated with the incremental snapshot archive is stored at a remote location instead of on the storage system; that is, the incremental snapshot archive includes the data stored in the leaf nodes of the snapshot tree that have not been previously archived. For example, an incremental snapshot archive associated with a backup snapshot at t=3, as depicted in FIG. 3C, includes root node 306, intermediate node 318, and leaf node 334. The incremental snapshot archive at t=3 does not include root nodes 302, 304, intermediates nodes 312, 314, 316, or leaf nodes 322, 324, 326, 328, 330 332 because those nodes were previously archived.

In some embodiments, the filesystem data is archived according to an archive policy. For example, an archive policy may indicate that a full snapshot archive is to be performed on a periodic basis (e.g., every W hour(s), every X day(s), every Y week(s), every Z month(s), etc.). An archive policy may indicate that a full snapshot archive is to be performed each time a full backup snapshot is performed. In some embodiments, an archive policy may indicate that one or more previous snapshot archives are to be deleted after a full backup snapshot archive is performed. In some embodiments, an archive policy may indicate that one or more file system data files and corresponding serialized snapshot tree data are to be deleted after a full snapshot archive is performed. An archive policy may indicate that an incremental snapshot archive is to be performed on a periodic basis (e.g., every W hour(s), every X day(s), every Y week(s), every Z month(s), etc.). An archive policy may indicate that an incremental snapshot archive is to be performed each time an incremental snapshot is performed. An archive policy may indicate that an incremental snapshot archive is to be performed on a more frequent basis than a full snapshot archive. The full snapshot archive and incremental snapshot archives are associated with a backup snapshot at a particular moment in time. For example, archive data 400 is associated with the snapshot tree at time t=1, archive data 450 is associated with the snapshot tree at time t=2, and archive data 480 is associated with the snapshot tree at time t=3. As seen in FIGS. 4A-4C, each snapshot archive builds off of a previous snapshot archive, that is, a block of serialized data includes a file offset to a block associated with previously serialized data. As more and more archives are created, this may require a lot of storage to store the archives. To reduce the amount of storage needed to store the archives, a policy may indicate that after a full snapshot archive, such as depicted in FIG. 4D, is performed at a particular point in time, one or more previous snapshot archives (i.e., archives 400, 450, 480) may be deleted from the remote storage location. In some embodiments, the one or more previous snapshot archives are deleted after a condition of retention time policy has passed.

Figure 2E:
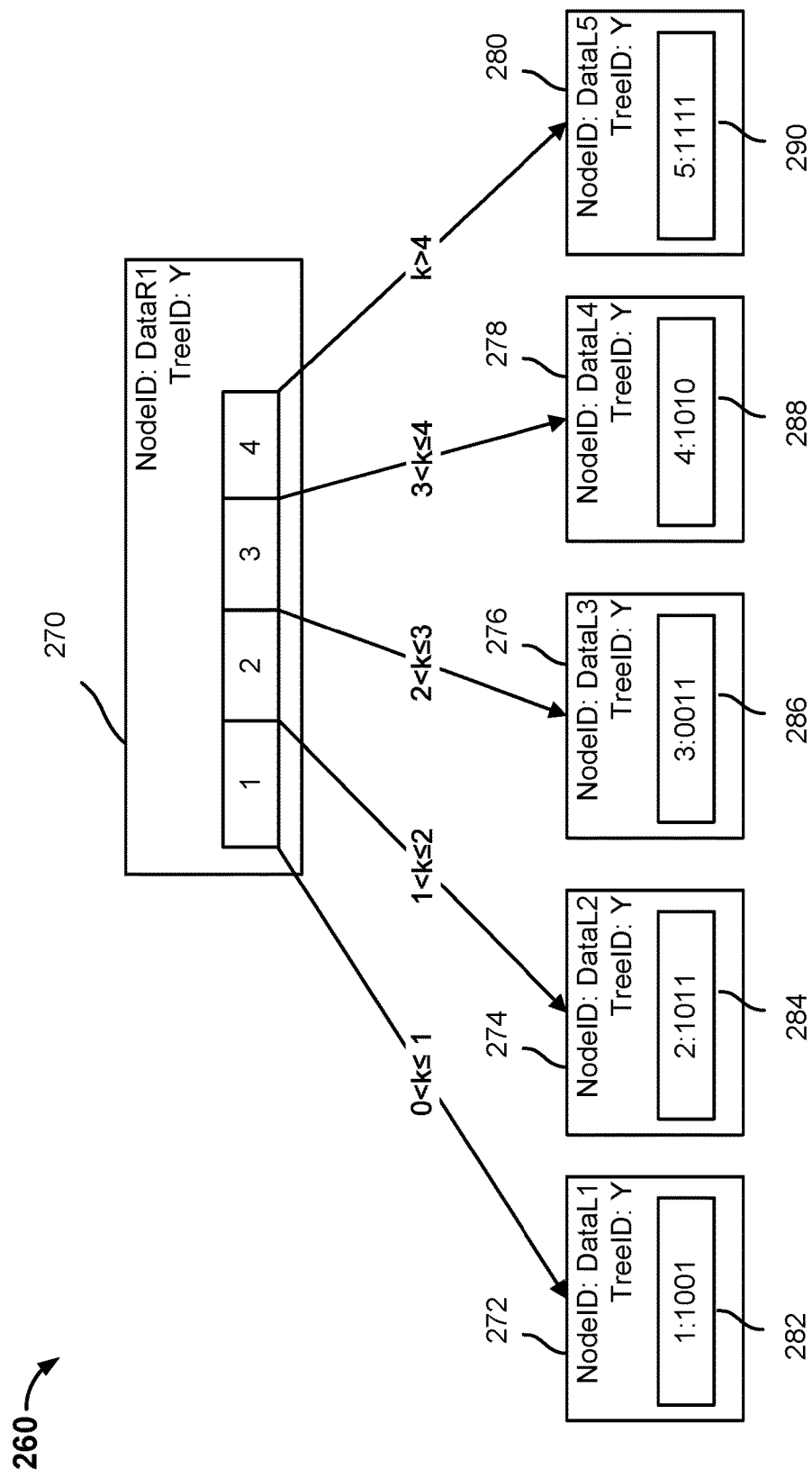
FIG. 2E is a block diagram illustrating an embodiment of file system data.

At 504, a snapshot tree associated with a view is serialized into serialized snapshot tree data and file system data associated with the view is serialized into serialized file system data. Serializing the snapshot tree into serialized snapshot tree data creates a flat set of data that represents the snapshot tree. In some embodiments, the file system data may be stored in a tree data structure, such as the tree data structure depicted in FIG. 2E. Serializing the file system data into serialized file system data creates a flat set of data that represents the file system data. The snapshot tree and the file system data are serialized into flat sets of data because a remote location may be incapable of storing a tree data structure.

The serialized snapshot tree data, i.e., a flat set of data, is comprised of one or more blocks. The serialized snapshot tree is a representation of a snapshot tree in block form. Each block of the serialized snapshot tree data corresponds to a node of a snapshot tree. Instead of a node having one or more pointers to one or more other nodes, a block of the serialized snapshot tree may include one or more file offsets to one or more other blocks. The file offsets represent the pointers of a snapshot tree. A block may include a file offset to another block in the serialized snapshot tree data. A block may include a file offset to another block in a previously serialized snapshot tree data. For example, a snapshot tree node may include a pointer to a node associated with a previous snapshot tree. A block that corresponds to the snapshot tree node may include a file offset to the block of a previously serialized snapshot tree data block that corresponds to the node associated with the previous snapshot tree. The snapshot tree node may also include a pointer to a node associated with the current snapshot tree. A block that corresponds to the snapshot tree node may include a file offset to the block of the current serialized snapshot tree data that corresponds to the node associated with the current snapshot tree.

The serialized file system data, i.e., a flat set of data, is comprised of one or more blocks. Each block of the serialized file system data corresponds to a data block or data segment of the file system data.

In some embodiments, a full snapshot is performed and the serialized snapshot tree data includes a plurality of blocks that correspond to the plurality of nodes of the snapshot tree. In some embodiments, one or more backup snapshots performed before the full backup snapshot are deleted. In other embodiments, an incremental backup snapshot is performed and the serialized snapshot tree data includes a plurality of blocks that correspond to the one or more root nodes and the one or more nodes that have been added to a snapshot tree since a previous archive. In some embodiments, an incremental backup snapshot is performed for a plurality of different snapshot trees and the corresponding serialized snapshot tree data includes file blocks corresponding to the plurality of different snapshot trees. In some embodiments, a serialized snapshot tree data combines the plurality of blocks that correspond to the one or more root nodes and the one or more nodes that have been added to a snapshot tree since a previous archive with one or more blocks from one or more previous archives.

At 506, the serialized snapshot tree data and serialized file system data are archived. The serialized snapshot tree data and serialized file system data may be archived, to a remote location, such as cloud 121. Within cloud storage, the snapshot archive comprising the serialized snapshot tree data and serialized file system data may be stored in a cloud object storage location, such as cloud object storage 124. The file system data is comprised of data blocks of a file and/or data segments of a file, and may be stored as a set of flat data. In some embodiments, the file system data is a full snapshot archive of the file system data stored in or referenced by the one or more leaf nodes of a snapshot tree. Each of the data blocks/segments comprising the file system data stored in the one or more leaf nodes of a snapshot tree may be stored in the set of flat data. In some embodiments, the file system data is an incremental snapshot archive of the file system data stored in or referenced by the one or more leaf nodes of a snapshot tree. The incremental snapshot archive may include changes to the data of a snapshot tree since a last snapshot archive (e.g., new data or modified data). Each of the data blocks/segments comprising the changes to the data of a snapshot tree since a last snapshot archive may be stored in the set of flat data. In some embodiments, the serialized snapshot tree data and file system data are archived to remote storage (e.g., cloud, cluster storage system, etc.). The file system data may be stored in one or more files. File system metadata may be stored in one or more separate files. The file system metadata may include a reference to a file system data file and vice versa.

Figure 6:
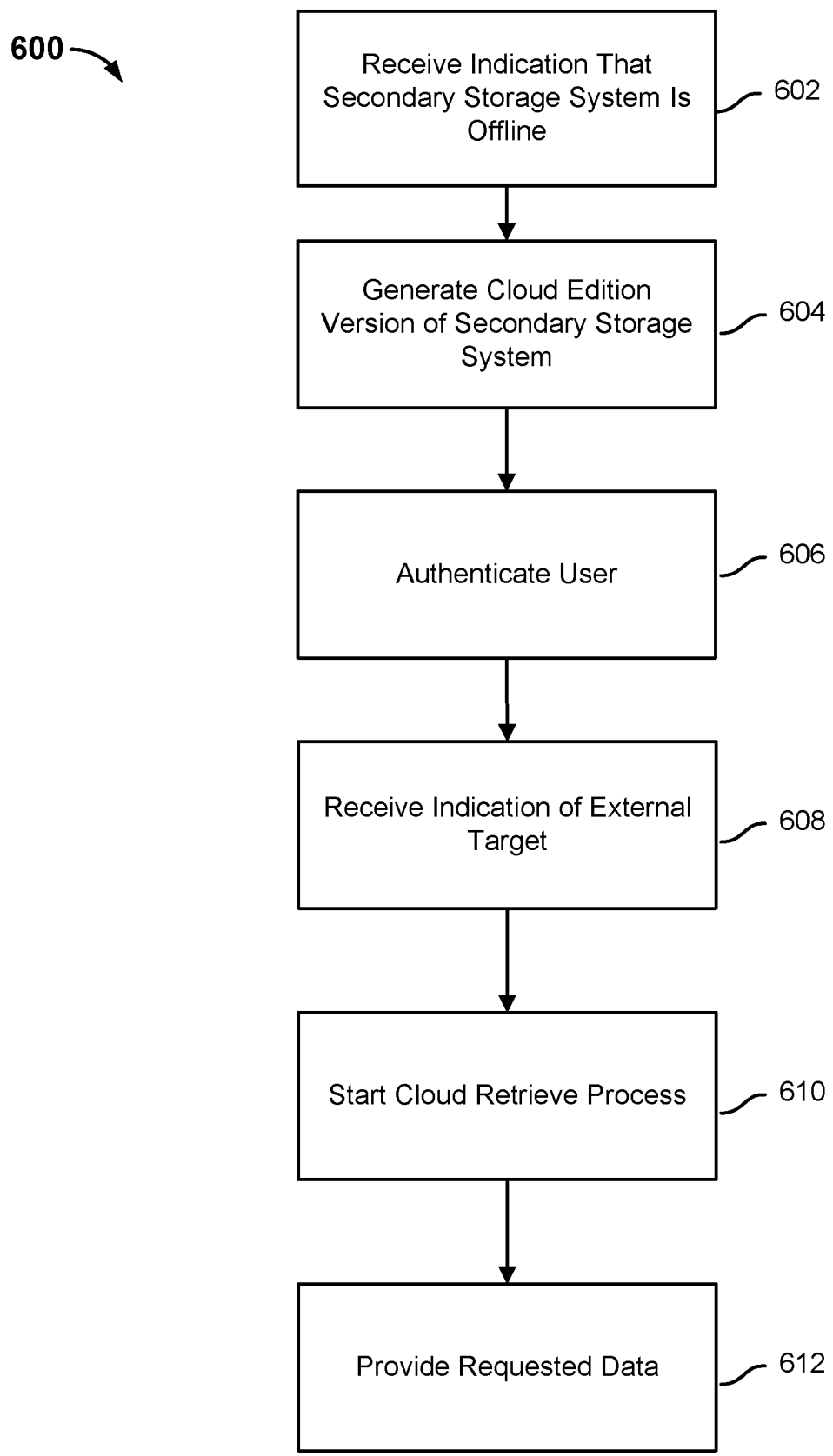
FIG. 6 is a flow chart illustrating an embodiment of a process for restoring data.

FIG. 6 is a flow chart illustrating an embodiment of a process for restoring data. In the example shown, process 600 may be performed by a cloud portal, such as cloud portal 123.

At 602, an indication that a secondary storage system is offline is received. A secondary storage system may be coupled to a primary system and configured to receive a backup snapshot from the primary system. The backup snapshot is comprised of one or more data blocks. In response to receiving the backup snapshot, the secondary storage system is configured to store the one or more data blocks and organize the one or more data blocks using a tree data structure. The secondary storage system is configured to store a plurality of backup snapshots associated with the primary system. The secondary storage system is configured to archive to cloud storage one or more of the backup snapshots based on an archive policy. The archive policy may indicate that a backup snapshot is to be archived after being stored on the secondary storage system for a threshold duration (e.g., 30 days). The archive policy may indicate that a full snapshot archive of the file system data and/or an incremental snapshot archive of the file system data is to be performed.

A user associated with the primary system may send a request to the secondary storage system. The request may be a request to perform a backup snapshot to the secondary storage system. The request may be a request to restore one or more of the stored backup snapshots. The secondary storage system may be unable to satisfy the request for one or more reasons. For example, the secondary storage system may be offline due to a power outage, a plurality of the storage nodes comprising the secondary storage system have failed, etc.

In the event the secondary storage system is unable to restore to the primary system one or more of the stored backup snapshots, the primary system may provide the user an error message indicating that the secondary storage system is unable to restore the one or more stored backup snapshots. In response to receiving the error message, a user associated with the primary system may log into the cloud portal to start the cloud instantiation process.

In other embodiments, the secondary storage system may provide a heartbeat signal to the primary system. In the event the primary system does not receive the heartbeat signal within a threshold period, the primary system is configured to provide to a cloud portal an indication that the secondary storage system is offline, which causes the cloud portal to generate a cloud instantiation of the secondary storage system.

At 604, a cloud instantiation of the secondary storage system is generated. A secondary storage system is comprised of a plurality of storage nodes. Each storage node has a particular storage capacity. A cloud portal may provision resources for the cloud instantiation of the secondary storage system. The cloud instantiation of the secondary storage system corresponds to a virtual secondary storage cluster. The virtual secondary storage cluster may be configured to have the same storage capacity as the secondary storage system. For example, a secondary storage system may be comprised of three physical storage nodes, each physical storage node having a storage capacity of 10 TB. The cloud instantiation of the secondary storage system may be comprised of three virtual cloud instances, each virtual cloud instance having a storage capacity of 10 TB. The cloud instantiation of the secondary storage system may be configured for the public cloud (e.g., Amazon Web Services, Microsoft Azure, Google Cloud, etc.) in which the cloud instantiation will reside. A user may specify the public cloud in which the cloud instantiation will reside. In other embodiments, the virtual secondary storage cluster is configured to have more storage capacity than the secondary storage system. In other embodiments, the virtual secondary storage cluster is configured to have less storage capacity than the secondary storage system.

In other embodiments, the virtual secondary storage cluster may be configured to have a user-specified storage capacity. For example, the user may request to have 50 TBs of storage. Each virtual cloud instance may be configured to have a default storage capacity (e.g., 10 TB). To satisfy the user's request, the cloud instantiation of the secondary storage system may be comprised of five virtual cloud instances, each virtual cloud instance having a storage capacity of 10 TB. In other embodiments, the cloud instantiation of the secondary storage system is configured to have a default storage capacity (e.g., a virtual secondary storage cluster comprised of three virtual cloud instances, each having a storage capacity of 10 TB).

At 606, a user is authenticated. A user associated with the cloud instantiation of the secondary storage system may log into a user interface of the cloud instantiation. A cloud storage is configured to store a plurality of snapshot archives. An enterprise may be associated with one or more data centers. Each data center may have a corresponding secondary storage system. The corresponding secondary storage systems may be configured to archive corresponding backup snapshots to cloud storage based on one or more archive policies. A user associated with the enterprise may be permitted to access a snapshot archive and request a snapshot archive to be restored to one of the one or more data centers associated with the enterprise. In other embodiments, the user is associated with one of the enterprise's data centers. The user may be permitted to access snapshot archives specific to that particular data center and restore to a primary system of the particular data center or the secondary storage system of the particular data center, the snapshot archives specific to that particular data center.

A plurality of enterprises may have corresponding secondary storage systems. Each of the corresponding secondary storage systems may be configured to archive an enterprises' backup snapshots. A user may be permitted to access a subset of the snapshot archives. For example, a user associated with a first enterprise may be permitted to access snapshot archives associated with the first enterprise, but not permitted to access snapshot archives associated with a second enterprise. Similarly, a user associated with a second enterprise may be permitted to access snapshot archives associated with the second enterprise, but not permitted to access snapshot archives associated with the first enterprise.

The cloud portal may be configured to request the user to provide a credential that indicates the user is permitted to access the one or more snapshot archives associated with an enterprise. The user's credential may be linked to a subset of the plurality of snapshot archives. For example, the credential of the user associated with the first enterprise is linked to the snapshot archives associated with the first enterprise and the credential of the user associated with the second enterprise is linked to the snapshot archives associated with the second enterprise.

Upon authenticating the user, the user may have access to any of the snapshot archives included in the subset of snapshot archives.

At 608, an indication of an external target is received. The external target corresponds to a user destination system that will receive the data associated with a snapshot archive. The user destination system may correspond to a primary system of a data center or a secondary storage system of the data center. The archive data associated with a secondary storage system may be encrypted. The indication may include a key to decrypt the archive data.

At 610, the cloud retrieve process is started. A list of one or more snapshot archives available to be restored may be presented to a user via a cloud user interface. A request for one or more snapshot archives is received from the user. The request may include an associated destination for the file system data associated with the selected snapshot archive. The request may specify which secondary storage systems the user desires to restore (e.g., an enterprise may be associated with a plurality of secondary storage systems, which snapshot archives to restore, a date range associated with a snapshot archive to restore, and a format for the file system data associated with the snapshot archive.)

One or more secondary storage clusters may be virtually rebuilt in the cloud instantiation of the secondary storage system using the one or more snapshot archives requested by the user. Virtually rebuilding a secondary storage cluster includes reconstituting a tree data structure based on the one or more requested snapshot archives.

A snapshot archive may correspond to a backup snapshot that was stored on the secondary storage system and archived to cloud storage. In some embodiments, the snapshot archive corresponds to a backup snapshot that is stored on the secondary storage system (e.g., a duplicate copy of the backup snapshot). In other embodiments, the snapshot archive corresponds to a backup snapshot that is not stored on the secondary storage system (e.g., the backup snapshot was stored on the secondary storage system past a retention period, archived to cloud storage, and removed from the secondary storage system).

The request for one or more snapshot archives may be for the entire snapshot archive or a portion of the snapshot archive. For example, a user may request to restore an entire snapshot archive to restore the primary system to a particular moment in time. The user may request to restore a portion of the snapshot archive to restore one or more files that are included in the snapshot archive.

At 612, the requested data is provided to the external target. A user may register and provide an external target for the requested data. For example, the user may register a primary system to receive the requested data. The user may register another secondary storage system to receive the requested data, (e.g., a new secondary storage system is brought online).

A snapshot archive is comprised of file system data and serialized snapshot tree data. The cloud instantiation of the secondary storage system is configured to reconstitute a snapshot tree associated with the snapshot archive by deserializing the serialized data file. The cloud instantiation of the secondary storage system is configured to store the file system data and the deserialized tree data across the virtual cloud instances (e.g., the file system data is stored in the cloud instantiation of the secondary storage system). In some embodiments, the cloud instantiation of the secondary storage system is configured to provide all of the file system data associated with the snapshot archive.

In other embodiments, the cloud instantiation of the secondary storage system is configured to provide a portion of the file system data associated with the snapshot archive. For example, a subset of the files included in the snapshot archive may be requested. The cloud instantiation of the secondary storage system is configure to traverse the reconstituted snapshot tree and to locate the file system data associated with the requested subset of files. Upon location, the cloud instantiation of the secondary storage system may provide the requested data to the primary system associated with the user or to another location.

Figure 7:
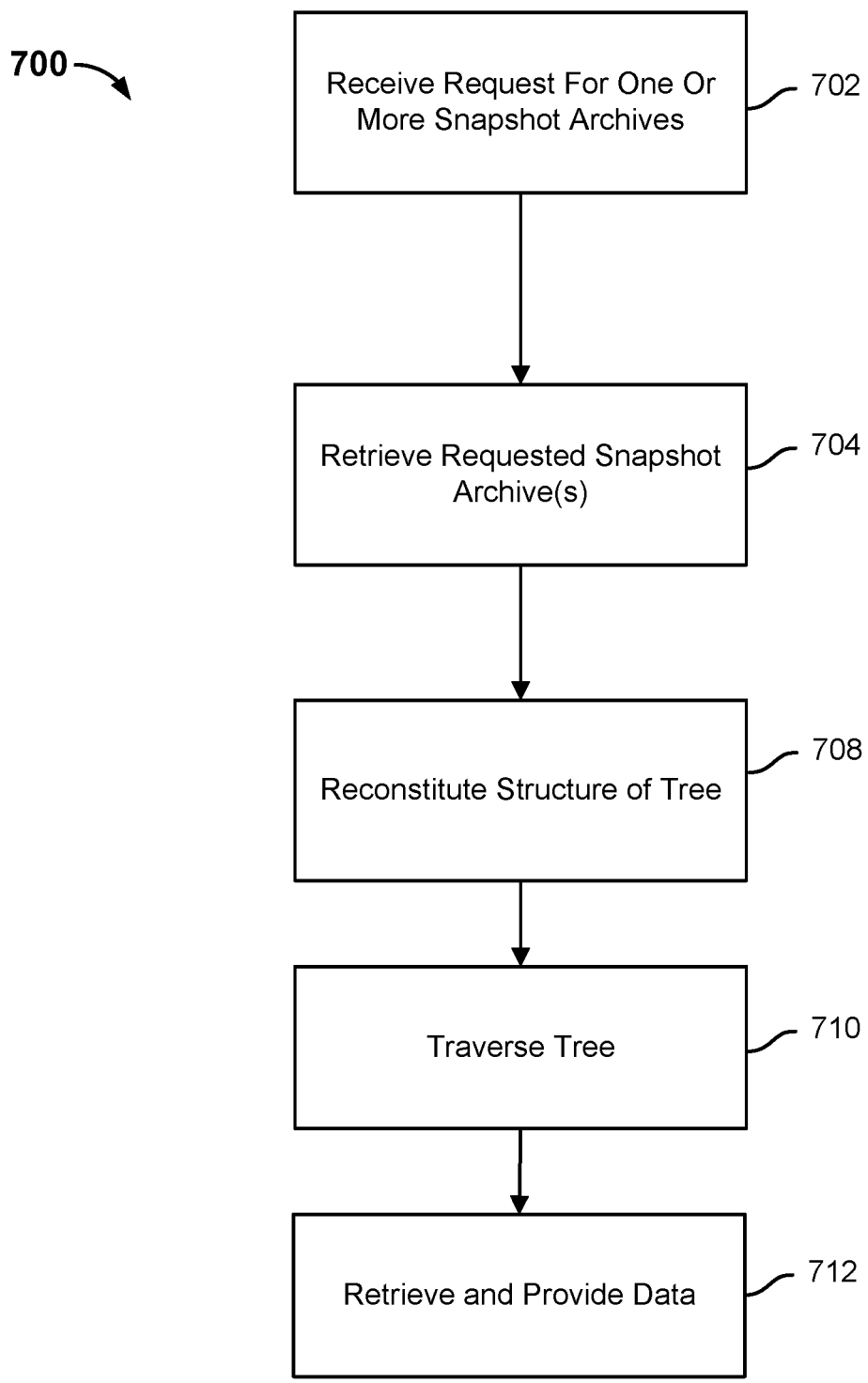
FIG. 7 is a flow chart illustrating an embodiment of restoring archived data.

FIG. 7 is a flow chart illustrating an embodiment of restoring archived data. In the example shown, process 700 may be performed by a storage system, such as a cloud instantiation 122 of secondary storage system 104. Process 700 may be implemented to perform some or all of steps 610, 612 of process 600.

At 702, a request for one or more snapshot archives may be received. A primary system may be configured to send a backup snapshot comprising primary system file system data to a secondary storage system. The backup snapshot is comprised of a plurality of data blocks. In response to receiving the backup snapshot, the secondary storage system may be configured to store the data blocks associated with the backup snapshot and to organize the file system data using a tree data structure, e.g., a snapshot tree.

The secondary storage system (e.g., a secondary storage cluster) may be configured to archive a snapshot tree to a remote storage location, such as cloud storage. A snapshot archive may include file system data and serialized snapshot tree data. File system data includes one or more data blocks that comprise the file system data. A snapshot tree associated with the file system data is serialized into serialized snapshot tree data. Serializing is a process by which a data file is generated to store data in a manner that mimics the structure of a tree data structure. The serialized data file may be encoded in a manner that allows the serialized data file to be utilized to reconstruct a desired portion of the tree data structure to obtain a data of interest from the serialized data file without the need to reconstruct the entire tree data structure. A serialized snapshot tree data stores the structure of the snapshot tree associated with the file system data as a flat set of data that is comprised of one or more blocks. Each block of the flat set of data corresponds to a node of the snapshot tree. The order of the data blocks of the serialized data file corresponds to an order of the tree data structure. A tree data structure may have a root node, a plurality of intermediate nodes, and a plurality of leaf nodes. The serialized data file may include blocks corresponding to the root node, then the plurality of intermediate nodes, and then the plurality of leaf nodes. For example, a first data block of the serialized data file may correspond to a root node of the tree data structure, a second data block of the serialized data file may correspond to a first intermediate node of the tree data structure, a third data block of the serialized data file may correspond to a second intermediate node of the tree data structure, a fourth data block of the serialized data file may correspond to a first leaf node of the tree data structure, . . . and an nth data block of the serialized data file may correspond to the nth leaf node of the tree data structure. The blocks that correspond to an intermediate node or a root node may include a file offset to another block of the serialized snapshot tree data or a file offset to another block of a different serialized snapshot tree data, i.e., serialized snapshot tree data associated with a different snapshot archive. A block that corresponds to a leaf node may include a file offset to a portion of the archived file system data.

In some embodiments, the request for one or more snapshot archives is for a snapshot archive that corresponds to an incremental snapshot archive. For example, a user may desire to restore one or more files associated with a backup snapshot without having to restore all of the file system data associated with a backup snapshot.

In other embodiments, the request for one or more snapshot archives is for a snapshot archive that corresponds to a full snapshot archive. For example, a user may desire to restore the file system of a primary system or other system to a state associated with a full backup snapshot.

In other embodiments, the request for one or more snapshot archives is a snapshot archive that corresponds to an incremental snapshot archive and one or more other snapshot archives. For example, a user may desire to restore the file system of a primary system or other system to a state associated with an incremental backup snapshot. Since the incremental backup snapshot includes file system data that was not previously backed up, file system data associated with one or more other backup snapshots are needed to restore the file system to the state associated with the incremental backup snapshot. The file system data associated with the one or more other backup snapshots is stored in the one or more other snapshot archives.

In some embodiments, a request for one snapshot archive causes one or more other snapshot archives associated with the requested snapshot archive to be requested because the one or more other snapshot archives are needed to restore the file system of a primary system or other system to a particular state.

At 704, the one or more requested snapshot archives are retrieved from cloud storage. A snapshot archive is comprised of file system data associated with the snapshot tree and serialized snapshot tree data associated with a snapshot tree. An archive of file system data may comprise a first set of flat data. An archive of serialized snapshot tree data may comprise a second set of flat data. For example, at least a portion of one or more file system archives 451, 453, 455 of FIGS. 4A-4C and at least a portion of one or more archives of serialized snapshot tree data 461, 463, 465 of FIGS. 4A-4C may be retrieved. In some embodiments, data corresponding to an incremental snapshot archive is retrieved. In some embodiments, data corresponding to a full snapshot archive is retrieved. In some embodiments, data corresponding to a full snapshot archive and one or more incremental snapshot archives are retrieved. The archive file system data is stored in the virtual cloud instances of the cloud instantiation. In some embodiments, the file system data is stored in the same manner in the virtual cloud instances of the cloud instantiation as the physical storage nodes of the secondary storage system.

At 706, a snapshot tree associated with the one or more retrieved snapshot archives is reconstituted. A virtual file manager of the cloud instantiation may virtually rebuild one or more secondary storage systems by reconstituting a snapshot tree by deserializing serialized snapshot tree data associated with a snapshot archive. In other embodiments, the snapshot tree is reconstituted by deserializing serialized snapshot tree data associated with a plurality of snapshot archives. In some embodiments, the one or more other snapshot archives comprising serialized snapshot tree data were archived before the requested snapshot archive comprising the serialized snapshot tree data. Reconstituting the structure of a snapshot tree corresponding to the requested snapshot archive includes reading the flat set of data associated with the serialized snapshot tree data. The flat set of data may include blocks of data that correspond to nodes of a snapshot tree and associated file offsets that correspond to pointers of the snapshot tree.

For example, for a request associated with snapshot archive 480, the complete snapshot tree at t=3 may be reproduced based on serialized snapshot tree data 465, 463, 461. The virtual file system manager of a cloud instantiation may deserialize the serialized snapshot tree data. Root node 306 may be reproduced because serialized snapshot tree data 465 includes a block 406 that corresponds to root node 306 of the snapshot tree, which includes offsets to blocks associated with intermediate nodes 312, 318.

Intermediate node 312 may be reproduced because block 406 includes an offset to block 412, which corresponds to intermediate node 312. The data associated with intermediate node 312 may be determined from serialized snapshot tree data 461.

Intermediate node 318 may be reproduced because block 406 includes an offset to block 418, which corresponds to intermediate node 318. The data associated with intermediate node 318 may be determined from serialized snapshot tree data 465.

Leaf node 334 may be reproduced because block 418 includes an offset to block 434, which corresponds to leaf node 334. The value associated with leaf node 334 may be accessed and reproduced because block 434 includes an offset to one or more blocks of data stored in file system data 455.

Leaf nodes 322, 324, 326 may be reproduced because block 406, which corresponds to root node 306, includes an offset to block 412 of serialized snapshot tree data 461.

Block 412 of serialized snapshot tree data 461 corresponds to intermediate node 312. Block 412 includes an offset to blocks 422, 424, 426, which correspond to leaf nodes 322, 324, 326, respectively. The corresponding values associated with leaf nodes 322, 324, 326 may be accessed and reproduced because blocks 422, 424, 426 include file offsets to one or more blocks of data stored in file system data 451.

Leaf node 330 may be reproduced because block 418 of serialized snapshot tree data 465 includes an offset to block 430 of serialized snapshot tree data 461. Block 430 of serialized snapshot tree data 461 corresponds to leaf node 330. The value associated with leaf node 330 may be accessed and reproduced because block 430 includes an offset to one or more blocks of data stored in file system data 451.

In some embodiments, a partial tree data structure is reproduced by deserializing one or more serialized snapshot tree data. For example, for the request of a value associated with a data key of "4" at time t=3, a portion of tree data structure 380 may be reproduced based on serialized snapshot tree data 465. As seen in FIG. 3C, leaf node 334 has a data key-value pair of "4: DATA4''" and a TreeID of "3." Because a TreeID of "3" is associated with a snapshot tree view at t=3, the value stored in leaf node 334, as opposed to the value stored in leaf nodes 328, 332, is the value of a data key "4" at t=3. Although serialized snapshot tree data 465 includes file offsets to serialized snapshot tree data 463, 461, serialized snapshot tree data 461 463 do not need to be deserialized because the requested value may be determined without deserializing those files. In some embodiments, a subset of the serialized snapshot tree data needed to produce the entire snapshot is deserialized to determine the value for a data key at the particular time.

At 708, the reproduced tree data structure is traversed to locate the data associated with a user request. A user may request to restore an entire snapshot archive to restore the primary system to a particular moment in time or the user may request to restore a portion of the snapshot archive to restore one or more files that are included in the snapshot archive.

The reproduced tree is traversed based on the one or more data keys associated with the request. For example, for a request for a value associated with a data key of "4" at time t=3, reproduced tree data structure 380 may be traversed from reproduced root node 306 to reproduced intermediate node 318 to reproduced leaf node 334.

At 710, the requested data is retrieved from cloud instantiation of the secondary storage system and provided. For example, for a request for a value associated with a data key of "4" at time t=3, a value of "DATA4''" may be retrieved from the file system data stored in the virtual cloud instances of the cloud instantiation and provided.

In some embodiments, all of the file system data associated with the reproduced snapshot tree is provided. In other embodiments, a portion of the file system data associated with the reproduced snapshot tree is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
generating a cloud instantiation of a secondary storage system;
receiving an indication to virtually rebuild one or more secondary storage clusters based on a snapshot archive stored in cloud storage, wherein the snapshot archive is comprised of serialized data, wherein the serialized data is comprised of a flat set of data blocks, wherein each data block included in the flat set of data blocks corresponds to one of a plurality of nodes of a tree data structure, wherein the tree data structure is comprised of a root node, one or more intermediate nodes, and one or more leaf nodes;
virtually rebuilding the one or more secondary storage clusters including by reconstituting the tree data structure in the cloud instantiation of the secondary storage system based on the serialized data included in the snapshot archive, wherein the reconstituted tree data structure is comprised of at least the root node, one of the one or more intermediate nodes, and one of the one or more leaf nodes; and
providing a copy of at least a portion of data of the one or more rebuilt storage clusters in the cloud instantiation to restore at least the portion of data to a user destination system.

2. The method of claim 1, further comprising receiving an indication that the secondary storage system is offline.

3. The method of claim 2, wherein the indication that the secondary storage system is offline includes a request to generate the cloud instantiation of the secondary storage system.

4. The method of claim 3, further comprising authenticating a user associated with the request.

5. The method of claim 4, further comprising in response to authenticating the user associated with the request, providing a list of one or more snapshot archives available to restore.

6. The method of claim 1, wherein generating the cloud instantiation of the secondary storage system includes provisioning cloud resources for the cloud instantiation of the secondary storage system.

7. The method of claim 6, wherein the provisioned cloud resources include a plurality of virtual cloud instances.

8. The method of claim 6, wherein the provisioned cloud resources include a same storage capacity as the secondary storage system.

9. The method of claim 1, wherein the tree data structure is reconstituted by deserializing the serialized data.

10. The method of claim 1, wherein the snapshot archive corresponds to a state of file system data associated with a primary system at a particular moment in time.

11. A system, comprising:
a processor configured to:
generate a cloud instantiation of a secondary storage system;
receive an indication to virtually rebuild one or more secondary storage clusters based on a snapshot archive stored in cloud storage, wherein the snapshot archive is comprised of serialized data, wherein the serialized data is comprised of a flat set of data blocks, wherein each data block included in the flat set of data blocks corresponds to one of a plurality of nodes of a tree data structure, wherein the tree data structure is comprised of a root node, one or more intermediate nodes, and one or more leaf nodes; and
virtually rebuild the one or more secondary storage clusters including by reconstituting the tree data structure in the cloud instantiation of the secondary storage system based on the serialized data included in the snapshot archive; and a communication interface coupled to the processor and configured to provide a copy of at least a portion of data of the one or more rebuilt storage clusters in the cloud instantiation to restore at least the portion of data to a user destination system.

12. The system of claim 11, wherein the communication interface is further configured to receive the indication that the secondary storage system is offline.

13. The system of claim 12, wherein the indication that the secondary storage system is offline includes a request to generate the cloud instantiation of the secondary storage system.

14. The system of claim 13, wherein the processor is further configured to authenticate a user associated with the request.

15. The system of claim 14, wherein in response to an authentication of the user associated with the request, the processor is further configured to provide a list of one or more snapshot archives available to restore.

16. The system of claim 11, wherein to generate the cloud instantiation of the secondary storage system, the processor is further configured to provision cloud resources for the cloud instantiation of the secondary storage system.

17. The system of claim 16, wherein the provisioned cloud resources include a plurality of virtual cloud instances.

18. The system of claim 16, wherein the provisioned cloud resources include a same storage capacity as the secondary storage system.

19. A computer program product, the computer program product being embodied in a non-transitory computer readable storage medium and comprising computer instructions for:

generating a cloud instantiation of a secondary storage system;

receiving an indication to virtually rebuild one or more secondary storage clusters based on a snapshot archive stored in cloud storage, wherein the snapshot archive is comprised of serialized data, wherein the serialized data is comprised of a flat set of data blocks, wherein each data block included in the flat set of data blocks corresponds to one of a plurality of nodes of a tree data structure, wherein the tree data structure is comprised of a root node, one or more intermediate nodes, and one or more leaf nodes;

virtually rebuilding the one or more secondary storage clusters including by reconstituting the tree data structure in the cloud instantiation of the secondary storage system based on the serialized data included in the snapshot archive, wherein the reconstituted tree data structure is comprised of at least the root node, one of the one or more intermediate nodes, and one of the one or more leaf nodes; and providing a copy of at least a portion of data of the one or more rebuilt storage clusters in the cloud instantiation to restore at least the portion of data to a user destination system.

20. The computer program product of claim 19, further comprising computer instructions for generating the cloud instantiation of the secondary storage system includes provisioning cloud resources for the cloud instantiation of the secondary storage system.

* * * * *